United States Patent
Suetsugu

(10) Patent No.: US 12,284,935 B2
(45) Date of Patent: Apr. 29, 2025

(54) WORK MANAGEMENT SYSTEM

(71) Applicant: Katsunori Suetsugu, Tokyo (JP)

(72) Inventor: Katsunori Suetsugu, Tokyo (JP)

( * ) Notice: Subject to any disclaimer, the term of this patent is extended or adjusted under 35 U.S.C. 154(b) by 417 days.

(21) Appl. No.: 17/740,700

(22) Filed: May 10, 2022

(65) Prior Publication Data

US 2022/0400599 A1 Dec. 22, 2022

(30) Foreign Application Priority Data

Jun. 17, 2021 (JP) ................................ 2021-100662

(51) Int. Cl.
| | |
|---|---|
| *A01B 79/00* | (2006.01) |
| *A01B 79/02* | (2006.01) |
| *A01M 13/00* | (2006.01) |
| *A01M 17/00* | (2006.01) |
| *G06Q 10/0631* | (2023.01) |
| *G06Q 10/20* | (2023.01) |

(52) U.S. Cl.
CPC ............ *A01B 79/005* (2013.01); *A01B 79/02* (2013.01); *A01M 13/00* (2013.01); *A01M 17/00* (2013.01); *G06Q 10/06316* (2013.01); *G06Q 10/20* (2013.01)

(58) Field of Classification Search
CPC ...... A01B 79/005; A01B 79/02; A01M 13/00; A01M 17/00; A01M 7/0089; G06Q 10/06316; G06Q 10/20; A47L 9/28
See application file for complete search history.

(56) References Cited

U.S. PATENT DOCUMENTS

2021/0138660 A1* 5/2021 Miyawaki .............. B23Q 17/20

FOREIGN PATENT DOCUMENTS

| JP | 2015-027345 | | 2/2015 |
|---|---|---|---|
| JP | 2015088066 A | * | 5/2015 |
| JP | 2016-149024 | | 8/2016 |
| JP | 6373032 B2 | * | 8/2018 |
| JP | 2021-039576 | | 3/2021 |

* cited by examiner

*Primary Examiner* — Eman A Alkafawi
*Assistant Examiner* — Dilara Sultana
(74) *Attorney, Agent, or Firm* — Wenderoth, Lind & Ponack, L.L.P.

(57) ABSTRACT

A work management system includes an estimation unit that estimates a performed work amount based on a position of a portion of a work object to which a fluid is estimated to be blown while the work is performed. In addition, the work management system includes a first correction unit that compares a target passing position through which a fluid blowing device passes while the work is performed with a position of the fluid blowing device to determine whether the fluid blowing device has passed through the target passing position while the work is performed, and executes a first correction process of reducing the work amount estimated by the estimation unit when it is determined that the fluid blowing device has not passed through the target passing position.

11 Claims, 12 Drawing Sheets

WORK MANAGEMENT SYSTEM

1. TECHNICAL FIELD

The present invention relates to a work management system that manages work performed on a work object.

2. DESCRIPTION OF THE RELATED ART

Regarding various work such as cleaning work, agricultural work, and maintenance work, a work management system and a work situation evaluation method of managing work performed on a work object by moving a device for performing the work on the work object and using the device that is moving are known. In addition, as a device that performs work on a work object, there is a device that detects a work position.

JP 2016-149024 A discloses a technique in which, in a method of evaluating a cleaning situation, a computer executes processing of acquiring a captured image of a predetermined area and calculating an evaluation value regarding cleaning in the predetermined area according to a change in a detection position of a cleaning member when the cleaning member is detected in the acquired captured image.

JP 2015-27345 A discloses a technique of a vacuum cleaning apparatus that performs cleaning while moving in a predetermined cleaning target area, the apparatus including: a cleaning execution unit; a display unit having a display screen; a cleaning position detection unit that detects a cleaning position by the cleaning execution unit in the cleaning target area when cleaning is executed; a movement history detection unit that detects a movement history in the cleaning target area when cleaning is executed on the basis of at least a temporal change in the cleaning position detected by the cleaning position detection unit; a cleaned area detection unit that detects a cleaned area in the cleaning target area on the basis of the movement history detected by the movement history detection unit; and a control unit that displays information on the cleaned area detected by the cleaned area detection unit on the display screen of the display unit.

JP 2021-39576 A discloses a technique of a cleaning load management device including: an operation history acquisition unit that acquires operation history information indicating an operation history of each of at least one device installed in a room; a cleaning load acquisition unit that acquires load result information indicating a cleaning load which is a work load required for cleaning the room; a coefficient determination unit that determines a neural network coefficient of a neural network for obtaining a cleaning load when the room is cleaned after a user has stayed in the room on the basis of the operation history information and the load result information; and a neural network calculation unit that obtains the cleaning load when the room is cleaned on the basis of the operation history information in a cleaning load prediction target period including at least a part of a period in which the user has stayed in the room by using the neural network having the neural network coefficient determined by the coefficient determination unit.

SUMMARY OF THE INVENTION

A case is considered in which work is performed by blowing fluid to a work object by using, as a device that performs work on a work object, a fluid blowing device that blows fluid to the work object. In addition, a case is considered in which the position of the work object is stored, the position of the fluid blowing device and the direction in which the fluid is blown out are measured, the position of a portion of the work object to which the fluid is blown is calculated on the basis of the stored position of the work object and the measured position of the fluid blowing device and the direction in which the fluid is blown, and a work amount of the performed work is estimated.

In such a case, how much the work is performed depends on a distance between the fluid blowing device and the portion of the work object to which the fluid is blown. Therefore, it is difficult to accurately evaluate the work amount performed on the work object by simply calculating the position of the portion of the work object to which the fluid is estimated to be blown on the basis of the position of the work object, the position of the fluid blowing device, and the direction in which the fluid is blown.

Alternatively, as a method of accurately evaluating the work amount performed on the work object, it may be desirable to correct the work amount in consideration of an influence exerted on the time when the work is performed next after the work is performed by blowing the fluid to the work object by using the fluid blowing device.

However, the techniques described in JP 2016-149024 A, JP 2015-27345 A, and JP 2021-39576 A do not take into consideration the fact that when work is performed by blowing the fluid to the work object by using the fluid blowing device, how much work is performed depends on the distance between the fluid blowing device and the portion of the work object to which the fluid is blown. Therefore, in the techniques described in JP 2016-149024 A, JP 2015-27345 A, and JP 2021-39576 A, it is difficult to accurately evaluate the work amount performed on the work object.

The present invention has been made to solve the above-described problems of the prior art, and an object of the present invention is to provide a work management system that manages work performed by blowing a fluid to a work object using a fluid blowing device that is moving, the work management system being capable of accurately evaluating a work amount performed on the work object.

A summary of a representative invention among the inventions disclosed in the present application will be briefly described as follows.

A work management system in an aspect of the present invention is a work management system that manages work performed by moving a fluid blowing device that blows a fluid to a work object and blowing the fluid to the work object by using the fluid blowing device that is moving. The fluid blowing device includes: a first measurement unit that measures a first position that is a position of the fluid blowing device; and a second measurement unit that measures a first direction that is a direction in which the fluid is blown out from the fluid blowing device. The work management system includes: a first storage unit that stores a second position that is a position of the work object; a first input unit that receives input of a plurality of the first positions measured by the first measurement unit at a plurality of time points and a plurality of the first directions measured by the second measurement unit at the plurality of time points while first work that is the work is performed on the work object; a calculation unit that calculates a third position that is a position of a portion of the work object to which the fluid is estimated to be blown while the first work is performed based on the second position stored in the first storage unit and the plurality of first positions and the plurality of first directions input to the first input unit; and an estimation unit that estimates a first work amount that is a work amount of the first work performed on the work object based on the third position calculated by the calculation unit. The work management system includes: a setting unit that sets a first target passing position that is a target position through which the fluid blowing device passes while the first work is performed on the work object; and a first correction unit that compares the first target passing position set by the setting unit with each of the plurality of first positions to determine whether the fluid blowing device has passed through the first target passing position while the first work is performed, and executes a first correction process of reducing the first work amount estimated by the estimation unit when it is determined that the fluid blowing device has not passed through the first target passing position while the first work is performed.

In another aspect, the first correction unit may not perform the first correction process when it is determined that the fluid blowing device has passed through the first target passing position while the first work is performed.

In another aspect, the setting unit may set a second target passing position that is a target position through which the fluid blowing device passes while the first work is performed on the work object, and an order in which the fluid blowing device passes through the first target passing position and the second target passing position. The first correction unit may: compare the first target passing position set by the setting unit with each of the plurality of first positions, and compare the second target passing position set by the setting unit with each of the plurality of first positions to determine whether the fluid blowing device has passed through the first target passing position and the second target passing position while the first work is performed; execute the first correction process when it is determined that the fluid blowing device has not passed through the first target passing position while the first work is performed; execute the first correction process when it is determined that the fluid blowing device has not passed through the second target passing position while the first work is performed; determine whether the fluid blowing device has passed through the first target passing position and the second target passing position in the order set by the setting unit while the first work is performed when it is determined that the fluid blowing device has passed through both the first target passing position and the second target passing position while the first work is performed; and execute the first correction process when it is determined that the fluid blowing device has not passed through the first target passing position and the second target passing position in the order that has been set while the first work is performed.

In another aspect, the work management system may include a second input unit that receives input of a first degree of influence indicating a degree of influence exerted on a time when second work that is the work is performed next on the work object after the first work is performed on the work object. The first correction unit may compare the first degree of influence input to the second input unit with a first threshold value, and execute the first correction process when the first degree of influence exceeds the first threshold value.

A work management system in an aspect of the present invention is a work management system that manages work performed by moving a fluid blowing device that blows a fluid to a work object and blowing the fluid to the work object by using the fluid blowing device that is moving. The fluid blowing device includes: a first measurement unit that measures a first position that is a position of the fluid blowing device; and a second measurement unit that measures a first direction that is a direction in which the fluid is blown out from the fluid blowing device. The work management system includes: a first storage unit that stores a second position that is a position of the work object; a first input unit that receives input of a plurality of the first positions measured by the first measurement unit at a plurality of time points and a plurality of the first directions measured by the second measurement unit at the plurality of time points while first work that is the work is performed on the work object; a calculation unit that calculates a third position that is a position of a portion of the work object to which the fluid is estimated to be blown while the first work is performed based on the second position stored in the first storage unit and the plurality of first positions and the plurality of first directions input to the first input unit; and an estimation unit that estimates a first work amount that is a work amount of the first work performed on the work object based on the third position calculated by the calculation unit. The work management system includes: a second input unit that receives input of a first degree of influence indicating a degree of influence exerted on a time when second work that is the work is performed next on the work object after the first work is performed on the work object; and a first correction unit that compares the first degree of influence input to the second input unit with a first threshold value, and executes a first correction process of reducing the first work amount estimated by the estimation unit when the first degree of influence exceeds the first threshold value.

In another aspect, the work management system may include a determination unit that determines a time when the second work is performed such that a time when the second work is performed next on the work object becomes earlier as a first decrease amount when the first work amount is decreased by executing the first correction process by the first correction unit is larger.

In another aspect, the work management system may manage cleaning work that is the work performed by blowing the fluid to the work object to blow off dust or dirt on a surface of the work object by using the fluid blowing device that is moving. The first degree of influence may be at least one selected from the group consisting of the number of users who have used the work object, a time when the user has used the work object, and an amount of dust or dirt on the surface of the work object.

In another aspect, the fluid blowing device is a blower that blows gas to the work object, the gas being the fluid, and the blower may include: a cylindrical portion; a suction port that is provided at a first end portion of the cylindrical portion in an axial direction and through which the gas is sucked; a blow-out port that is provided at a second end portion opposite to the first end portion in the axial direction of the cylindrical portion and through which the gas is blown out; and a fan that is provided inside the cylindrical portion, sucks the gas from the suction port, and blows out, from the blow-out port, the gas sucked from the suction port. The first storage unit may store the second position that is a position on the surface of the work object, and the calculation unit may calculate, as the third position, a fifth position that is a position of a portion located on a first axis passing through a fourth position and extending in a second direction on the surface of the work object based on the second position, the fourth position, and the second direction where, for each of the plurality of time points, the fourth position is the first position measured at the time point and the second direction is the first direction measured at the time point.

In another aspect, the work object is an agricultural land, and the work management system may manage agricultural work that is the work performed by blowing the fluid containing an agricultural chemical or water to the agricultural land by using the fluid blowing device that is moving. The first degree of influence may be at least one selected from the group consisting of the number of invading bodies including humans, vermin, or insect pests that have intruded into the agricultural land, a time during which the invading body has intruded into the agricultural land, a distance by which the invading body has moved in the agricultural land, and weather information on the agricultural land.

In another aspect, the work object is a machine, and the work management system may manage maintenance work that is the work performed by blowing the fluid to the machine by using the fluid blowing device that is moving. The first degree of influence may be at least one selected from the group consisting of a time during which the machine has operated, a distance by which the machine has moved when the machine is movable, a time during which a malfunction has occurred in the machine, and a type of the malfunction that has occurred in the machine.

In another aspect, the work management system may include: a third input unit that receives input of a second degree of influence indicating a degree of influence exerted on a time when third work that is the work is performed next on the work object after the first work is performed on the work object; and a second correction unit that compares the second degree of influence input to the third input unit with a second threshold value, and executes a second correction process of correcting the first target passing position so that the first target passing position set by the setting unit is moved close to a central position of the work object in plan view when the second degree of influence exceeds the second threshold value.

By applying one aspect of the present invention, in a work management system that manages work performed by blowing a fluid to a work object using a fluid blowing device that is moving, it is possible to accurately evaluate a work amount performed on the work object.

DETAILED DESCRIPTION

Figure 1:
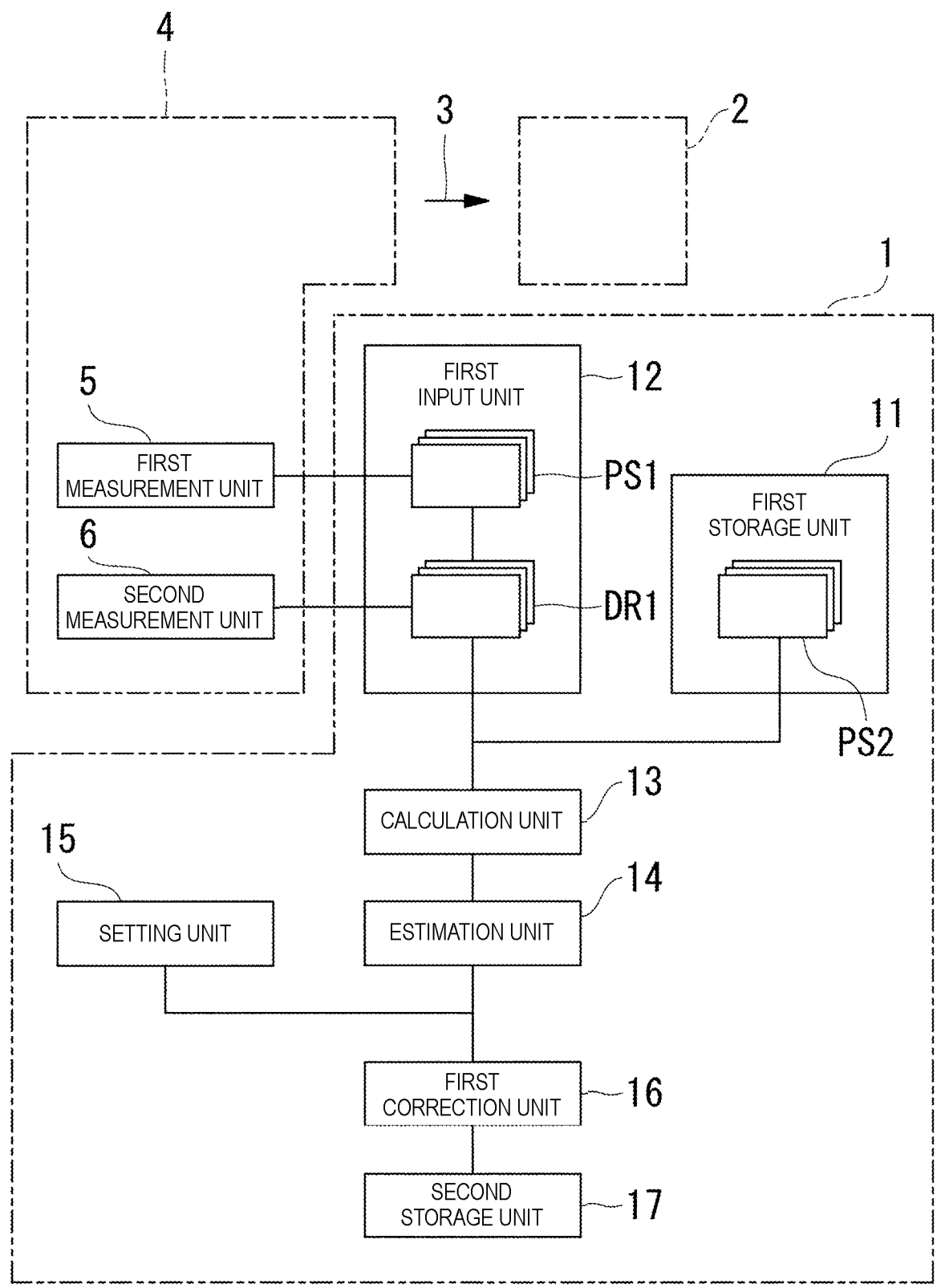
FIG. 1 is a block diagram illustrating a configuration of a work management system according to a first embodiment.

Hereinafter, embodiments and modifications of the present invention will be described with reference to the drawings.

The disclosure is merely an example, and appropriate modifications that can be easily conceived by those skilled in the art while maintaining the gist of the invention are naturally included in the scope of the present invention. In addition, in order to make the description clearer, the drawings may schematically represent the width, thickness, shape, and the like of each part as compared with the embodiments, but they are merely examples and do not limit the interpretation of the present invention.

In addition, in the present specification and the drawings, elements similar to those described above with respect to the previously described drawings are denoted by the same reference numerals, and detailed description thereof may be appropriately omitted.

Furthermore, in the drawings used in the embodiments, hatching may be omitted to make the drawings easily viewable even in a sectional view. In addition, even in a plan view, hatching may be applied to make the drawing easily viewable.

In the following embodiments, when a range is indicated as A to B, A or more and B or less are indicated unless otherwise specified.

First Embodiment

Work Management System

A work management system according to a first embodiment, which is an embodiment of the present invention, will be described. FIG. 1 is a block diagram illustrating a configuration of the work management system according to the first embodiment.

As illustrated in FIG. 1, a work management system 1 according to the first embodiment is a work management system that manages work performed by moving a fluid blowing device 4 that blows a fluid 3 to a work object 2 and blowing the fluid 3 to the work object 2 by using the fluid blowing device 4 that is moving.

As illustrated in FIG. 1, the fluid blowing device 4 according to the first embodiment includes a first measurement unit 5 and a second measurement unit 6. The first measurement unit 5 measures a position PS1 that is a position of the fluid blowing device 4. The second measurement unit 6 measures a direction DR1 in which the fluid 3 is blown out from the fluid blowing device 4. The first measurement unit 5 is not particularly limited, but if it is outdoors, for example, a global navigation satellite system (GNSS) or the like that receives global positioning system (GPS) information by a GPS and calculates GPS position coordinates on the basis of the received GPS information can be used. In addition, the first measurement unit 5 is not particularly limited, but if it is indoors, for example, pedestrian dead reckoning (PDR) using a gyro sensor, an acceleration sensor, and the like can be used. In addition, the second measurement unit 6 is not particularly limited, but for example, a gyro sensor, an acceleration sensor, and the like can be used. As the fluid blowing device 4, for example, a fluid blowing device that moves by automatic traveling without a worker, such as a robot vacuum cleaner, can be used, and for example, a fluid blowing device that moves by being held and moved by a worker, such as a blower vacuum cleaner, can be used.

As illustrated in FIG. 1, the work management system 1 according to the first embodiment includes a first storage unit 11, a first input unit 12, a calculation unit 13, an estimation unit 14, a setting unit 15, and a first correction unit 16. The work management system 1 according to the first embodiment may or may not include the fluid blowing device 4 (the same applies to the second embodiment).

The first storage unit 11 stores a position PS2 that is a position of the work object 2. As described later, when a computer is used as the work management system according to the first embodiment, a storage unit such as a hard disk device constituting the computer can be used as the first storage unit.

The first input unit 12 receives input of a plurality of the positions PS1 measured by the first measurement unit 5 at a plurality of time points and a plurality of the directions DR1 measured by the second measurement unit 6 at the plurality of time points while work WR1 (see FIG. 3 to be described later), which is work, is performed on the work object 2.

The calculation unit 13 calculates a position PS3 (see FIG. 3 to be described later), which is the position of a portion of the work object 2 to which the fluid 3 is estimated to be blown while the work WR1 (see FIG. 3 to be described later) is performed, on the basis of the position PS2 stored by the first storage unit 11 and the plurality of positions PS1 and the plurality of directions DR1 input to the first input unit 12.

The estimation unit 14 estimates a work amount WL1 (see FIG. 3 to be described later), which is a work amount of the work WR1 (see FIG. 3 to be described later) performed on the work object 2, on the basis of the position PS3 (see FIG. 3 to be described later) calculated by the calculation unit 13.

The setting unit 15 sets a target passing position TP1 (see FIG. 3 to be described later), which is a target position through which the fluid blowing device 4 passes while the work WR1 (see FIG. 3 to be described later) is performed on the work object 2.

The first correction unit 16 compares the target passing position TP1 (see FIG. 3 to be described later) set by the setting unit 15 with each of the plurality of positions PS1 to determine whether the fluid blowing device 4 has passed through the target passing position TP1 while the work WR1 (see FIG. 3 to be described later) is performed, and executes a first correction process of reducing the work amount WL1 (see FIG. 3 to be described later) estimated by the estimation unit 14 when it is determined that the fluid blowing device 4 has not passed through the target passing position TP1 while the work WR1 is performed.

A computer can be used as the work management system 1 according to the first embodiment. In such a case, one computer can be used as the first storage unit 11, the first input unit 12, the calculation unit 13, the estimation unit 14, the setting unit 15, and the first correction unit 16, a plurality of computers connected to each other can be used, or a plurality of stand-alone computers can be used.

A computer used as the work management system 1 according to the first embodiment includes a central processing unit (CPU), a random access memory (RAM), a storage unit, a data/command input unit, an image display unit, an output unit, and the like.

Although not illustrated, the CPU is a portion that executes, on various data, processing such as four arithmetic operations (addition, subtraction, multiplication, and division), logical operations (logical product, logical sum, negative, exclusive logical sum, and the like), or data comparison or data shift, and the like. Although not illustrated, the storage unit includes a hard disk drive (HDD), a read only memory (ROM), and the like, and is a portion that stores a control program for controlling the CPU, various data used by the CPU, and the like. In addition, the ROM is generally constituted by a semiconductor chip or the like.

As a computer used as the work management system 1 according to the first embodiment, for example, a portable terminal such as a smartphone can be used. Alternatively, when a plurality of computers used as the work management system 1 according to the first embodiment communicate with each other, normal client-server communication or a blockchain using a network of peer-to-peer or node computers can be used.

Figure 2:
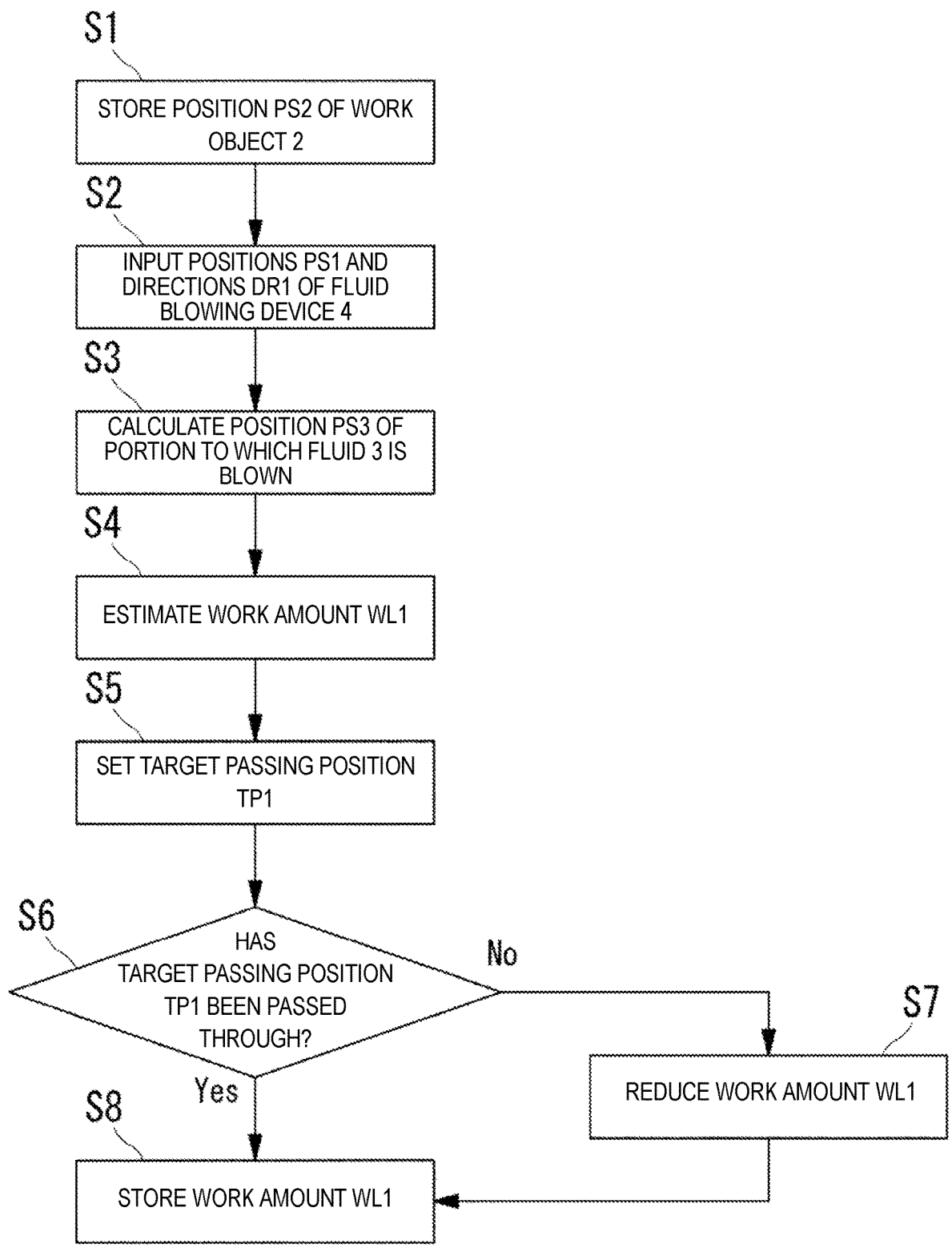
FIG. 2 is a flowchart illustrating some steps of an example of a work management method performed by the work management system according to the first embodiment.
Figure 3:
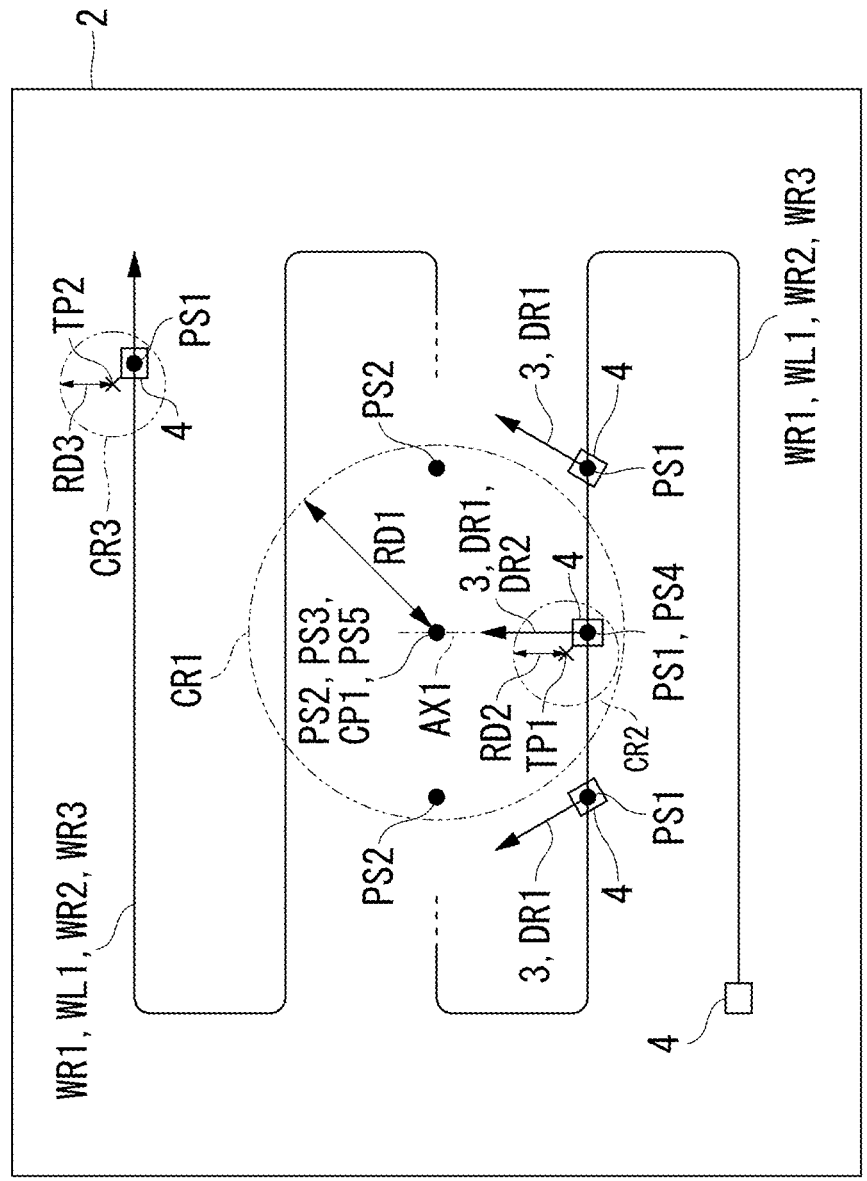
FIG. 3 is a diagram for explaining the work management method performed by the work management system according to the first embodiment.

Next, a work management method performed by the work management system 1 according to the first embodiment will be described. FIG. 2 is a flowchart illustrating some steps of an example of the work management method performed by the work management system according to the first embodiment. FIG. 3 is a diagram for explaining the work management method performed by the work management system according to the first embodiment. Although FIG. 3 is illustrated as a plan view for easy understanding, it goes without saying that position coordinates in the height direction are also to be considered when three-dimensional data (3D data) of a work space is used.

First, the first storage unit 11 stores the position PS2 that is a position of the work object 2 (step S1 in FIG. 2). Specifically, in step S1, for example, plane data (2D data) or three-dimensional data (3D data) of the work object 2 on which work is performed, that is, a work space to be a target of management or maintenance work (maintenance work), is acquired and registered in advance.

Next, the first input unit 12 receives input of the plurality of positions PS1 measured by the first measurement unit 5 at the plurality of time points and the plurality of directions DR1 measured by the second measurement unit 6 at the plurality of time points while the work WR1 (see FIG. 3), which is work, is performed on the work object 2 (step S2 in FIG. 2). This Step S2 is favorably performed by a computer installed at a work site that is a place away from a place where a computer in which steps other than step S2 among steps S1 to S6 are performed is installed. Therefore, the computer used as the first input unit 12 is favorably a computer different from the computer used as the first storage unit 11, the calculation unit 13, the estimation unit 14, the setting unit 15, and the first correction unit 16.

Next, the calculation unit 13 calculates the position PS3, which is the position of a portion of the work object 2 to which the fluid 3 is estimated to be blown while the work WR1 (see FIG. 3) is performed, on the basis of the position PS2 stored by the first storage unit 11 and the plurality of positions PS1 and the plurality of directions DR1 input to the first input unit 12 (step S3 in FIG. 2).

Next, the estimation unit 14 estimates the work amount WL1, which is a work amount of the work WR1 (see FIG. 3) performed on the work object 2, on the basis of the position PS3 calculated by the calculation unit 13 (step S4 in FIG. 2).

In addition, the setting unit 15 sets the target passing position TP1, which is a target position through which the fluid blowing device 4 passes while the work WR1 (see FIG. 3) is performed on the work object 2 (step S5 in FIG. 2). A method of setting the target passing position TP1 set in step S5 is not particularly limited as long as the distance between the fluid blowing device 4 and a portion of the work object 2 having a high priority for blowing the fluid 3 can be reliably set to equal to or smaller than a certain distance. Therefore, as a method of setting the target passing position TP1 set in step S5, the target passing position TP1 can be set such that, in a plan view, the target passing position TP1 is included in a circle CR1 (see FIG. 3) or a sphere having a center at a position CP1 (see FIG. 3) and a radius of a certain distance RD1 (see FIG. 3), the position CP1 having a priority of work higher than a certain threshold value in the work object 2, such as a center position of the work object 2, that is, the distance between the target passing position TP1 and the position CP1 is equal to or smaller than the distance RD1.

Step S5 may be performed before step S2 or after step S2.

Next, the first correction unit 16 compares the target passing position TP1 set by the setting unit 15 with each of the plurality of positions PS1, and the first correction unit 16 determines whether the fluid blowing device 4 has passed through the target passing position TP1 while the work WR1 (see FIG. 3) is performed (step S6 in FIG. 2). For example, when the position PS1 is included in a circle CR2 (see FIG. 3) or a sphere having a radius of a certain distance RD2 (see FIG. 3) around the target passing position TP1, that is, when the distance between the position PS1 and the target passing position TP1 is equal to or smaller than the distance RD2, it can be determined that the fluid blowing device 4 has passed through the target passing position TP1.

Here, when the first correction unit 16 determines that the fluid blowing device 4 has not passed through the target passing position TP1 while the work WR1 (see FIG. 3) is performed, the first correction unit 16 executes the first correction process of reducing the work amount WL1 estimated by the estimation unit 14 (step S7 in FIG. 2).

By contrast, when the first correction unit 16 determines that the fluid blowing device 4 has passed through the target passing position TP1 while the work WR1 (see FIG. 3) is performed, the first correction unit 16 does not execute the first correction process. Alternatively, when the first correction unit 16 determines that the fluid blowing device 4 has passed through the target passing position TP1 while the work WR1 is performed, the first correction unit 16 can also execute a correction process of reducing the work amount WL1 so that the first decrease amount when reducing the work amount WL1 is smaller than a second decrease amount when reducing the work amount WL1 when it is determined that the fluid blowing device 4 has not passed through the target passing position TP1 while the work WR1 is performed.

The work management system according to the first embodiment may include a second storage unit 17. The second storage unit 17 may store the work amount WL1 after the first correction process is executed by the first correction unit 16 (step S8 in FIG. 2). As a result, when work is performed, a record of when and how much work is performed is kept for each portion of the work object, that is, each portion of the work space to be managed or maintained. For example, the work object 2 can be divided into a plurality of areas and registered, and information indicating who cleaned or worked when can be recorded for each area. Similarly to the first storage unit 11, a storage unit such as a hard disk device constituting a computer can be used as the second storage unit 17.

Here, problems of a work management system that manages work performed by blowing a fluid to a work object by using a fluid blowing device will be described.

First, general problems of a conventional work management system will be described.

In the conventional work management system that manages work performed on a work object, it may not be possible to easily determine when and how much work processing has been performed on the work object or work space, or whether no work processing has been performed. Therefore, when and how much work is performed on the work object is not able to be easily determined, and efficient operation or management may not be performed on the work object or work space.

Here, examples of work that requires management of the work performed on the work object include the following various work. First, there are various maintenance work such as toilet cleaning, playing tool cleaning, and cleaning and sterilization in public transportation such as trains, the Shinkansen, and buses. In addition, various maintenance work such as cleaning and sterilization in stores or the like can be mentioned. In addition, various maintenance work such as agricultural work in an agricultural land can be mentioned.

However, in the above-described various work, in a case where it is not possible to grasp the history of various maintenance work such as cleaning and sterilization, and it is not possible to grasp how much work has been performed by who, it is not possible to easily determine when and how much work is to be performed on the work object next.

For example, in a case where the work object 2 is an agricultural land, if records of agricultural work performed on the agricultural land are not accurately kept, and records of when and how much agricultural work has been performed on the agricultural land are not accurately kept, when and how much agricultural work are performed on the agricultural land is not able to be easily determined.

Next, problems of the work management system that manages work performed by blowing the fluid to the work object by using the fluid blowing device will be described.

For example, a case is considered in which a position of the work object is stored, a position of the fluid blowing device and a direction in which the fluid is blown out are measured, a position of a portion of the work object to which the fluid is blown is calculated on the basis of the stored position of the work object and the measured position of the fluid blowing device and the direction in which the fluid is blown, and a work amount of the performed work is estimated.

In such a case, the position of the portion of the work object to which the fluid is estimated to be blown can be calculated on the basis of the stored position of the work object, the position of the fluid blowing device, and the direction in which the fluid is blown.

However, when the work is performed by blowing the fluid to the work object by using the fluid blowing device, how much the work is performed depends on the distance between the fluid blowing device and the portion of the work object to which the fluid is blown. Therefore, it is difficult to accurately evaluate the work amount performed on the work object by simply calculating the position of the portion of the work object to which the fluid is estimated to be blown on the basis of the position of the work object, the position of the fluid blowing device, and the direction in which the fluid is blown.

In principle, it is also possible to calculate the distance between the fluid blowing device and the portion of the work object to which the fluid is blown on the basis of the position of the work object, the position of the fluid blowing device, and the direction in which the fluid is blown. However, when the distance between the fluid blowing device and the portion of the work object to which the fluid is blown is actually calculated on the basis of the position of the work object, the position of the fluid blowing device, and the direction in which the fluid is blown, the calculation amount increases by the amount of such calculation processing. Furthermore, when the work object has a complicated shape due to, for example, unevenness on a surface of the work object, it is difficult to accurately evaluate the work amount performed on the work object by simply calculating the distance between the fluid blowing device and the portion of the work object to which the fluid is blown.

In the technique described in JP 2016-149024 A, a captured image of a predetermined area is acquired, and when a cleaning member is detected in the acquired captured image, an evaluation value regarding cleaning in the predetermined area is calculated according to a change in a detection position of the cleaning member. However, the technique described in JP 2016-149024 A does not take into consideration the fact that when work is performed by blowing a fluid to a work object by using a fluid blowing device, how much work is performed depends on the distance between the fluid blowing device and a portion of the work object to which the fluid is blown. Therefore, in the technique described in JP 2016-149024 A, it is difficult to accurately evaluate the work amount performed on the work object without increasing the calculation amount.

In the technique described in JP 2015-27345 A, a movement history in a cleaning target area at the time of performing cleaning is detected on the basis of a temporal change of a cleaning position detected by a cleaning position detection unit, and a cleaned area where cleaning has been performed in the cleaning target area is detected on the basis of the detected movement history. However, the technique described in JP 2015-27345 A does not take into consideration the fact that when work is performed by blowing a fluid to a work object by using a fluid blowing device, how much work is performed depends on the distance between the fluid blowing device and a portion of the work object to which the fluid is blown. Therefore, in the technique described in JP 2015-27345 A, it is difficult to accurately evaluate the work amount performed on the work object without increasing the calculation amount.

In the technique described in JP 2021-39576 A, operation history information indicating an operation history of each of at least one device installed in a room is acquired, load result information indicating a cleaning load that is a work load required for cleaning the room is acquired, and the cleaning load when the room is cleaned after a user has stayed in the room is obtained on the basis of the operation history information and the load result information. However, the technique described in JP 2021-39576 A does not take into consideration the fact that when work is performed by blowing a fluid to a work object by using a fluid blowing device, how much work is performed depends on the distance between the fluid blowing device and a portion of the work object to which the fluid is blown. Therefore, in the technique described in JP 2021-39576 A, it is difficult to accurately evaluate the work amount performed on the work object without increasing the calculation amount.

By contrast, the work management system 1 according to the first embodiment includes the first storage unit 11, the first input unit 12, the calculation unit 13, the estimation unit 14, the setting unit 15, and the first correction unit 16. The calculation unit 13 calculates the position PS3 that is the position of a portion of the work object 2 to which the fluid 3 is estimated to be blown while the work WR1 is performed, on the basis of the position PS2 stored by the first storage unit 11 and the plurality of positions PS1 and the plurality of directions DR1 input to the first input unit 12, and the estimation unit 14 estimates the work amount WL1 of the work WR1 performed on the work object 2 on the basis of the calculated position PS3. In addition, the first correction unit 16 compares the target passing position TP1 set by the setting unit 15 with each of the plurality of positions PS1, and the first correction unit 16 determines whether the fluid blowing device 4 has passed through the target passing position TP1 while the work WR1 is performed, and when it is determined that the fluid blowing device 4 has not passed through the target passing position TP1 while the work WR1 is performed, the first correction unit 16 executes the first correction process of reducing the work amount WL1 estimated by the estimation unit 14.

When it is determined that the fluid blowing device 4 has not passed through the target passing position TP1 while the work WR1 is performed, the distance between the fluid blowing device 4 and a portion of the work object 2 having a high priority for blowing the fluid 3 is not able to be reliably made equal to or smaller than a certain distance, and it is estimated that the degree of performing the work is lower than that when the fluid blowing device 4 has passed through the target passing position TP1 while the work WR1 is performed, and there is a possibility that the work amount WL1 estimated by the estimation unit 14 is overevaluated. Therefore, the work amount WL1 performed on the work object 2 can be accurately evaluated by executing, by the first correction unit 16, the first correction process of reducing the work amount WL1 estimated by the estimation unit 14.

By contrast, when it is determined that the fluid blowing device 4 has passed through the target passing position TP1 while the work WR1 is performed, the distance between the fluid blowing device 4 and a portion of the work object 2 having a high priority for blowing the fluid 3 can be reliably made equal to or smaller than the certain distance, so that the work amount WL1 performed on the work object 2 can be accurately evaluated, and the work amount WL1 can be substantially improved.

With the work management system 1 according to the first embodiment, in order to consider the distance between the fluid blowing device 4 and the portion of the work object 2 to which the fluid 3 is blown, it is not necessary to calculate the distance between the fluid blowing device 4 and the portion of the work object 2 to which the fluid 3 is blown on the basis of the position PS2 of the work object 2 and the position PS1 of the fluid blowing device 4 and the direction DR1 in which the fluid 3 is blown. Therefore, the calculation amount does not increase by the amount of such calculation processing. Even when the work object 2 has a complicated shape due to unevenness on the surface of the work object 2 or the like, the distance between the fluid blowing device 4 and the portion of the work object 2 to which the fluid 3 is blown can be considered without calculating the distance between the fluid blowing device 4 and the portion of the work object 2 to which the fluid 3 is blown, so that the work amount WL1 performed on the work object 2 can be accurately evaluated.

As a result, it is possible to easily determine when and how much work processing has been performed on each portion of the work object 2 or work space, or whether no work processing has been performed. Therefore, efficient operation or management can be performed on the work object 2 or work space.

In addition, regarding the various types of work described above, it is possible to easily grasp the history of when the work was performed on the work object 2 at the previous time, and it is possible to efficiently plan the future schedule as to when the work is desirably performed next time. In addition, it is possible to grasp who has performed the work on each portion of the work object 2 to what extent, and it is possible to accurately keep the record. Therefore, it is possible to easily determine when and how much work processing has been performed on each portion of the work object 2, or whether no work processing has been performed.

In addition, for example, even in a case where the work object 2 is an agricultural land, it is possible to accurately keep a record of agricultural work performed on the agricultural land, and it is possible to accurately keep a record of when and how much agricultural work has been performed on each portion of the agricultural land. Therefore, it is possible to easily determine when and how much agricultural work has been performed on each portion of the agricultural land, or whether agricultural work has not been performed yet.

Figure 4:
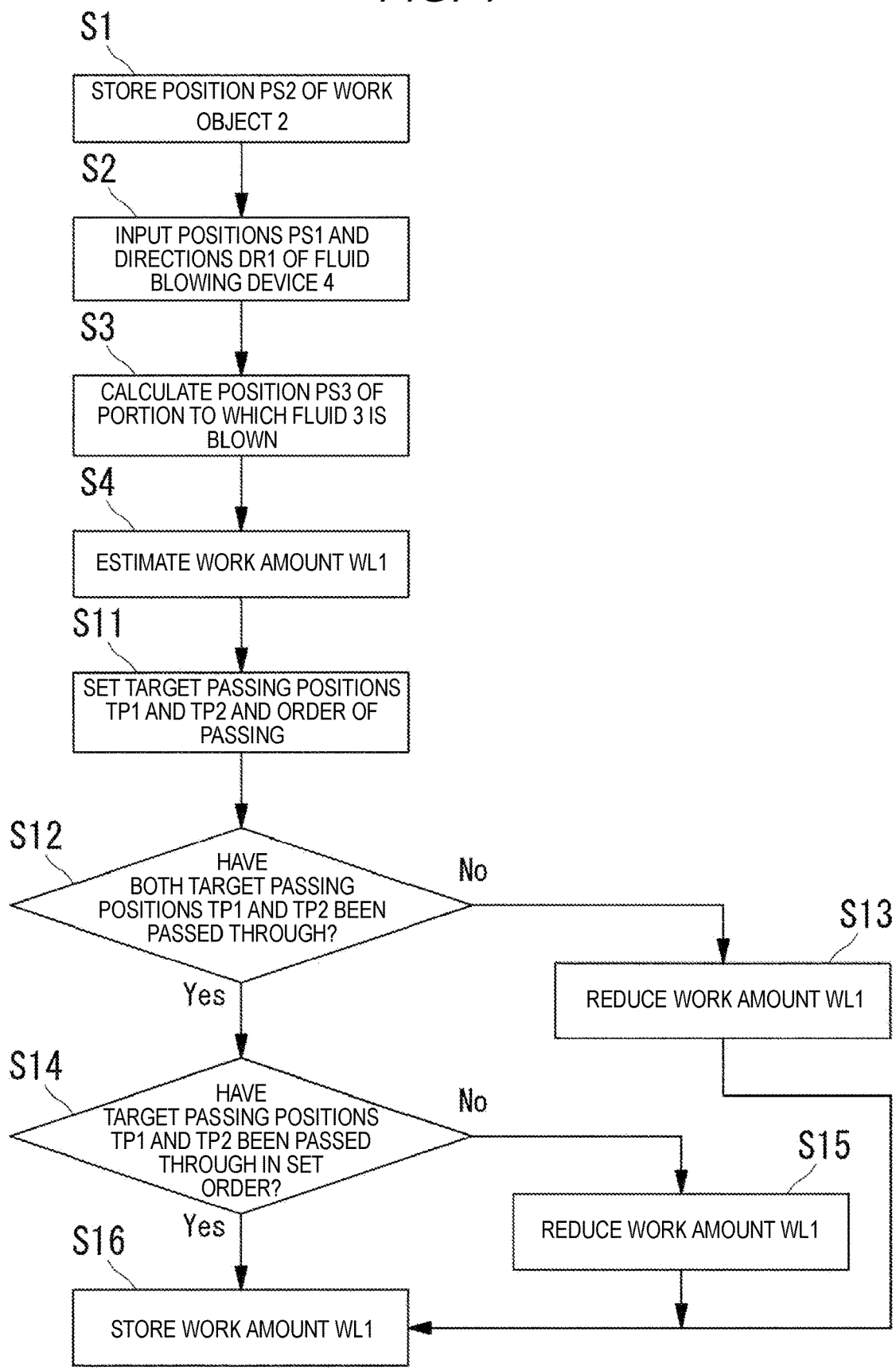
FIG. 4 is a flowchart illustrating some steps of another example of the work management method performed by the work management system according to the first embodiment.

FIG. 4 is a flowchart illustrating some steps of another example of the work management method performed by the work management system according to the first embodiment.

Favorably, instead of step S5 in FIG. 2, the setting unit 15 sets the target passing position TP1 and the target passing position TP2, which are the target positions through which the fluid blowing device 4 passes while the work WR1 (see FIG. 3) is performed on the work object 2, and the order in which the fluid blowing device 4 passes through the target passing position TP1 and the target passing position TP2 (step S11 in FIG. 4).

In addition, favorably, instead of step S6 in FIG. 2, the first correction unit 16 compares the target passing position TP1 set by the setting unit 15 with each of the plurality of positions PS1, and the first correction unit 16 compares the target passing position TP2 set by the setting unit 15 with each of the plurality of positions PS1, so that the first correction unit 16 determines whether the fluid blowing device 4 has passed through the target passing position TP1 and the target passing position TP2 while the work WR1 is performed (step S12 in FIG. 4). For example, when the position PS1 is included in a circle CR3 (see FIG. 3) or a sphere having a radius of a certain distance RD3 (see FIG. 3) around the target passing position TP2, that is, when the distance between the position PS1 and the target passing position TP2 is equal to or smaller than the distance RD3, it can be determined that the fluid blowing device 4 has passed through the target passing position TP2.

Here, when the first correction unit 16 determines that the fluid blowing device 4 has not passed through the target passing position TP1 while the work WR1 is performed, the first correction unit 16 executes the first correction process of reducing the work amount WL1 estimated by the estimation unit 14 (step S13 in FIG. 4). When the first correction unit 16 determines that the fluid blowing device 4 has not passed through the target passing position TP2 while the work WR1 is performed, the first correction unit 16 executes the first correction process of reducing the work amount WL1 estimated by the estimation unit 14 (step S13 in FIG. 4).

By contrast, when the first correction unit 16 determines that the fluid blowing device 4 has passed through both the target passing position TP1 and the target passing position TP2 while the work WR1 is performed, the first correction unit 16 determines whether the fluid blowing device 4 has passed through the target passing position TP1 and the target passing position TP2 in the order set by the setting unit 15 while the work WR1 is performed (step S14 in FIG. 4).

Here, when the first correction unit 16 determines that the fluid blowing device 4 has not passed through the target passing position TP1 and the target passing position TP2 in the order set by the setting unit 15 while the work WR1 is performed, the first correction unit 16 executes the first correction process of reducing the work amount WL1 estimated by the estimation unit 14 (step S15 in FIG. 4). The second storage unit 17 may store the work amount WL1 after the first correction process is executed by the first correction unit 16 (step S16 in FIG. 4).

By contrast, when the first correction unit 16 determines that the fluid blowing device 4 has passed through the target passing position TP1 while the work WR1 is performed, the first correction process is not performed.

In such a case, in addition to being able to evaluate whether the fluid blowing device 4 has passed through the two target passing positions, the order in which the fluid blowing device 4 has passed through the two target passing positions can be evaluated. Therefore, since the movement path for moving the fluid blowing device 4 can be efficiently selected, the work using the fluid blowing device 4 can be efficiently performed, for example, the work time can be shortened.

In steps S11 to S16, the number of target passing positions to be set is not limited to one or two, and may be any plural number of three or more. In such a case, in addition to being able to evaluate whether the fluid blowing device 4 has passed through three or more target passing positions, the order in which the fluid blowing device 4 has passed through the three or more target passing positions can be evaluated. Therefore, since the movement path for moving the fluid blowing device 4 can be selected more efficiently, the work using the fluid blowing device 4 can be performed more efficiently, for example, the work time can be further shortened.

Figure 5:
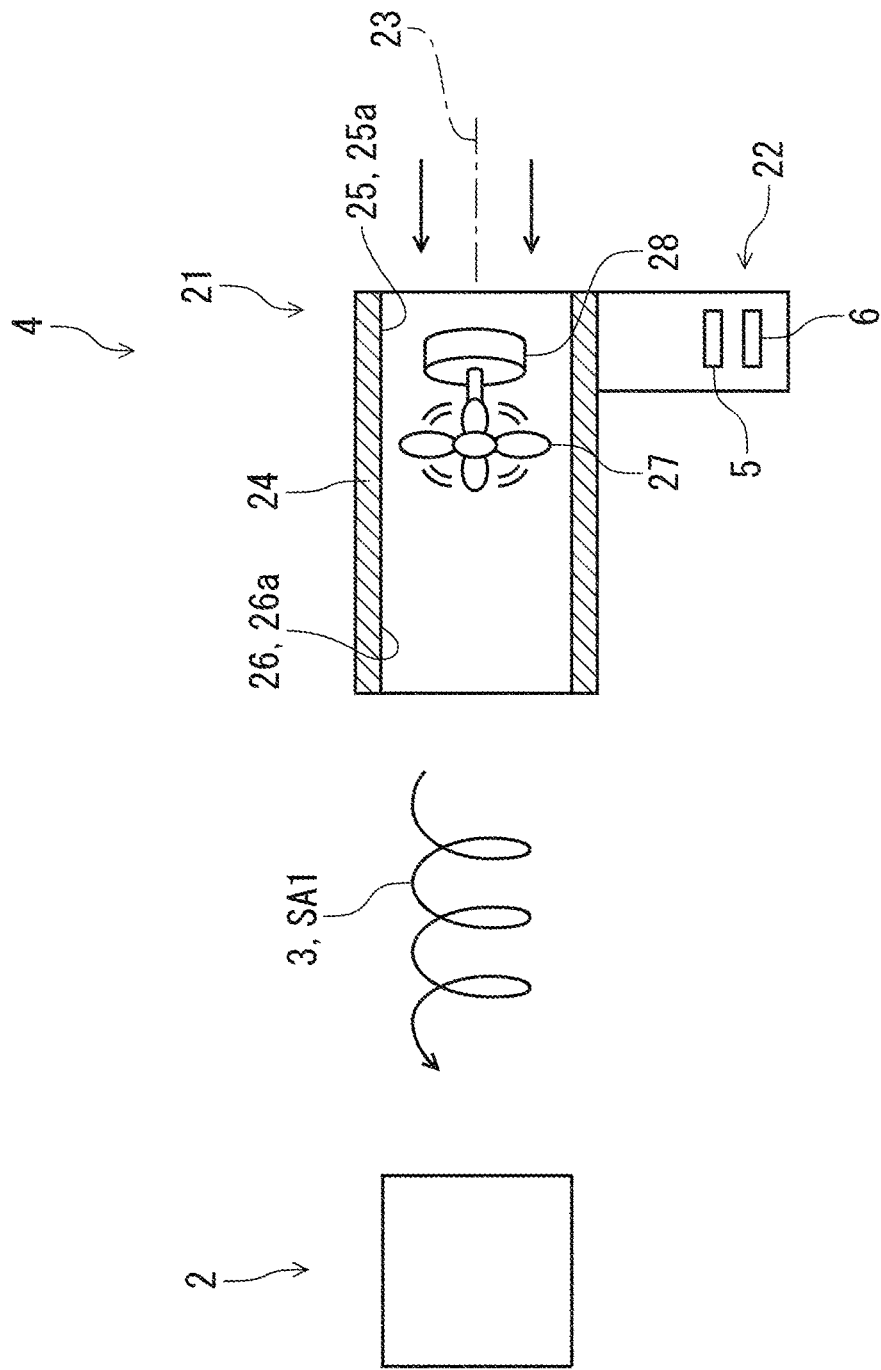
FIG. 5 is a diagram illustrating a configuration of an example of a fluid blowing device used in work managed by the work management system according to the first embodiment.

FIG. 5 is a diagram illustrating a configuration of an example of a fluid blowing device used in work managed by the work management system according to the first embodiment.

As illustrated in FIG. 5, a blower (circulator) that blows gas (air), which is the fluid 3, to the work object 2 can be used as the fluid blowing device 4. In such a case, the fluid blowing device 4 as the blower includes the first measurement unit 5, the second measurement unit 6, a blower unit 21, and a grip unit 22. It goes without saying that the fluid blowing device 4 is not limited to the example illustrated in FIG. 5 as long as the fluid blowing device 4 can blow the fluid 3 containing gas or liquid to the work object 2.

In the example illustrated in FIG. 5, the blower unit 21 included in the blower includes a cylindrical portion 24 centered on a central axis 23, a suction port 25, a blow-out port 26, a fan 27, and a drive unit 28. The suction port 25 is provided at an end portion 25a in a direction along the central axis 23 of the cylindrical portion 24, that is, in an axial direction, and sucks gas. The blow-out port 26 is provided at an end portion 26a opposite to the end portion 25a in the direction along the central axis 23 of the cylindrical portion 24, that is, in the axial direction, and blows out gas. The fan 27 is provided inside the cylindrical portion 24 so as to be rotatable about the central axis 23. The drive unit 28 rotationally drives the fan 27. In such a case, the fan 27 sucks the gas from the suction port 25 and blows out, from the blow-out port 26, the gas sucked from the suction port 25. In FIG. 5, the direction of the airflow of the gas that is the fluid 3 is indicated by an arrow.

As illustrated in FIG. 5, a spiral airflow SA1 may be blown out from the blow-out port 26 as an airflow of gas that is the fluid 3. When the spiral airflow SA1 having a spiral shape is blown out from the blow-out port 26, the airflow is more likely to travel straight without spreading than when an airflow having a shape other than the spiral shape is blown out. That is, straightness of the spiral airflow SA1 is higher than straightness of an airflow having a shape other than the spiral shape. Therefore, when a position PS5 (see FIG. 3) to be described later is calculated by the calculation unit 13, the calculated position PS5 can be brought closer to the position of the portion of the work object 2 to which the fluid 3 is estimated to be blown while the work WR1 (see FIG. 3) is performed.

When the blower is used as the fluid blowing device 4, the first storage unit 11 stores the position PS2, which is a position on the surface of the work object 2, in step S1 in FIG. 2.

In step S3 in FIG. 2, the calculation unit 13 calculates, as the position PS3, the position PS5 (see FIG. 3), which is the position of a portion located on an axis AX1 (see FIG. 3) passing through a position PS4 (see FIG. 3) and extending in a direction DR2 (see FIG. 3) on the surface of the work object 2, on the basis of the position PS2, the position PS4, and the direction DR2 where, for each of the plurality of time points, the position PS4 is the position PS1 measured at a certain time point and the direction DR2 is the direction DR1 measured at the certain time point.

By such a method, the position PS3 of the portion of the work object 2 to which the fluid 3 is estimated to be blown while the work WR1 is performed can be easily calculated with high accuracy.

First Modification of Work Management System

Next, a first modification of the work management system according to the first embodiment will be described. A work management system 1a according to the first modification is different from the work management system according to the first embodiment in that the work management system 1a includes a second input unit in addition to the first input unit 12.

Figure 6:
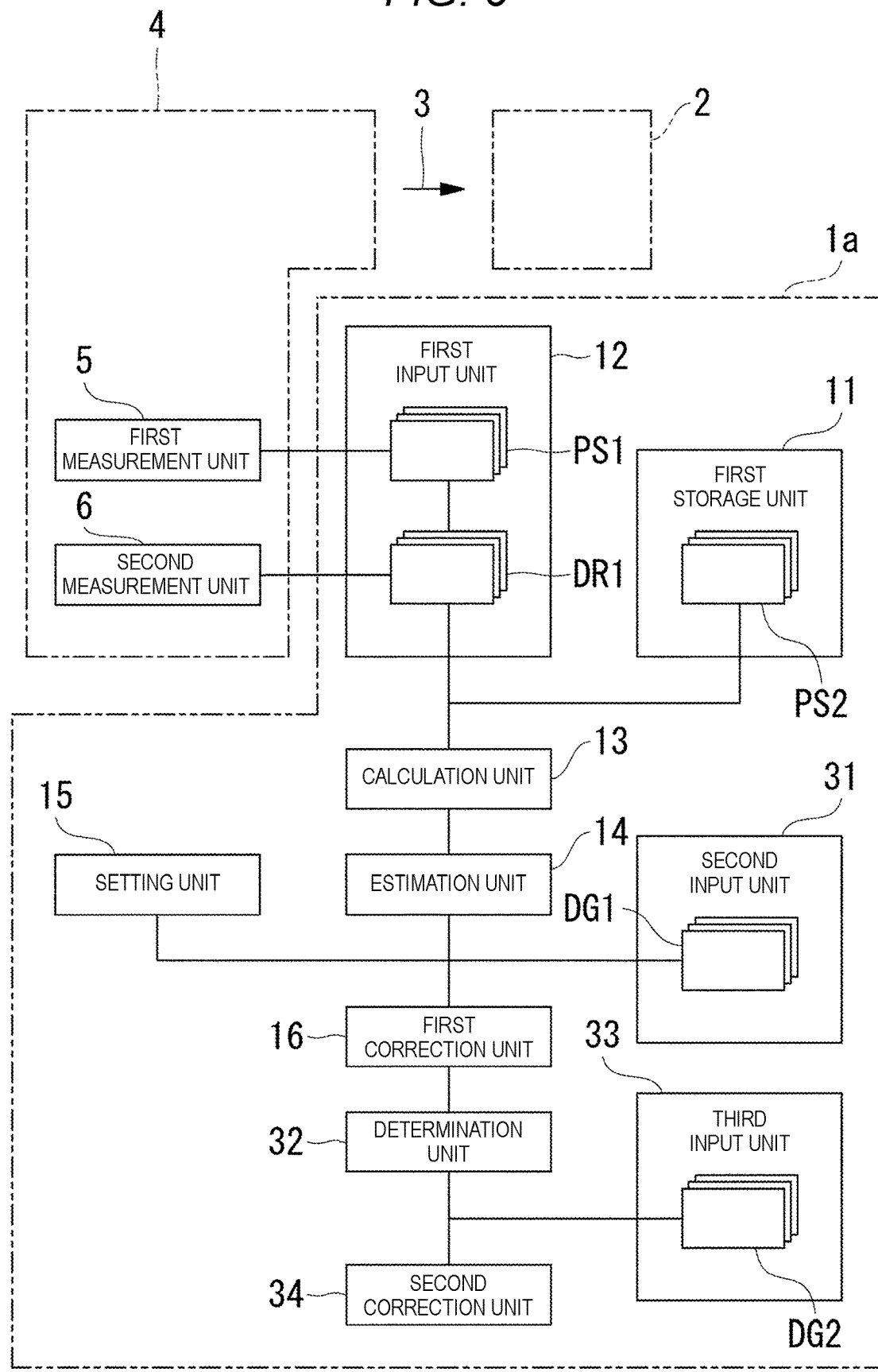
FIG. 6 is a block diagram illustrating a configuration of a work management system according to a first modification of the first embodiment.

FIG. 6 is a block diagram illustrating a configuration of the work management system according to the first modification of the first embodiment.

As illustrated in FIG. 6, the work management system 1a according to the first modification includes a second input unit 31 in addition to the first storage unit 11, the first input unit 12, the calculation unit 13, the estimation unit 14, the setting unit 15, and the first correction unit 16.

The second input unit 31 receives input of a degree of influence DG1 indicating the degree of influence exerted on the time when the work WR2 (see FIG. 3), which is the work, is performed next on the work object 2 after the work WR1 (see FIG. 3) is performed on the work object 2.

The first correction unit 16 compares the degree of influence DG1 input to the second input unit 31 with a first threshold value, and when the degree of influence DG1 exceeds the first threshold value, the first correction unit 16 executes the first correction process of reducing the work amount WL1 (see FIG. 3) estimated by the estimation unit 14.

A computer can be used as the work management system 1a according to the first modification similarly to the work management system 1 according to the first embodiment. In such a case, a computer can be used as the second input unit 31 similarly to the first storage unit 11, the first input unit 12, the calculation unit 13, the estimation unit 14, the setting unit 15, and the first correction unit 16.

Figure 7:
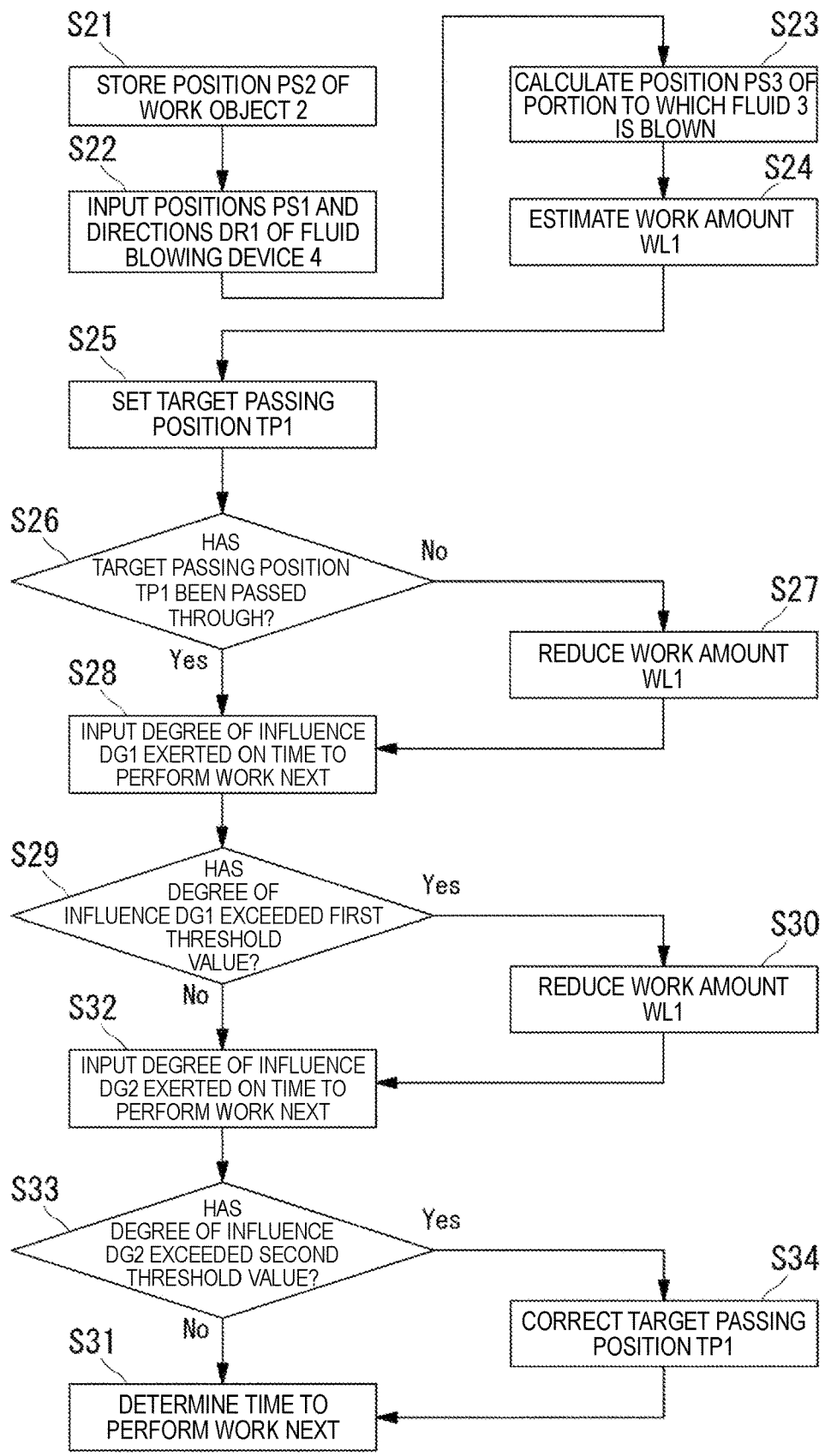
FIG. 7 is a flowchart illustrating some steps of a work management method performed by the work management system according to the first modification of the first embodiment.

Next, a work management method performed by the work management system 1a according to the first modification will be described. FIG. 7 is a flowchart illustrating some steps of the work management method performed by the work management system according to the first modification of the first embodiment.

Also in the work management method performed by the work management system 1a according to the first modification, similarly to the work management method performed by the work management system 1 according to the first embodiment, steps S21 to S27 in FIG. 7, which are steps corresponding to steps S1 to S7 in FIG. 2, are performed.

By contrast, in the work management method performed by the work management system 1a according to the first modification, unlike the work management method performed by the work management system 1 according to the first embodiment, the second input unit 31 receives input of the degree of influence DG1 indicating the degree of influence exerted on the time when the work WR2 (see FIG. 3), which is the work, is performed next on the work object 2 after the work WR1 (see FIG. 3) is performed on the work object 2 (step S28 in FIG. 7).

Next, the first correction unit 16 compares the degree of influence DG1 input to the second input unit 31 with the first threshold value (step S29 in FIG. 7), and when the degree of influence DG1 exceeds the first threshold value, the first correction unit 16 executes the first correction process of reducing the work amount WL1 estimated by the estimation unit 14 (step S30 in FIG. 7). By contrast, when the degree of influence DG1 does not exceed the first threshold value, the first correction unit 16 does not execute the first correction process of reducing the work amount WL1 estimated by the estimation unit 14.

As described above, as a method of accurately evaluating the work amount WL1 performed on the work object 2, it is conceivable to correct the work amount WL1 in consideration of the influence exerted on the time when the work WR2 is performed next after the work WR1 is performed by blowing the fluid 3 to the work object 2 by using the fluid blowing device 4. In order to consider the influence exerted on the time when the work WR2 is performed next, it is desirable to grasp not only the work amount WL1 as an internal factor but also the degree of influence DG1 as an external factor indicating the degree of influence exerted on the time when the work WR2 is performed next on the work object 2.

Here, the internal factor is a factor that directly affects the work amount WL1 from the inside on a manager side due to the behavior of the manager who manages the work object 2 or manages a worker performing the work on the work object 2.

The external factor is the number of users who utilize or use the work object 2 or work space, the amount of dust or dirt in the work object 2 or work space when the work is cleaning work, and the like, and is a factor that indirectly affects the work amount WL1 from the outside other than the manager. In other words, the external factor represents the degree of influence exerted on the time or timing at which the work WR2 is performed next on the work object 2 after the work WR1 is performed on the work object 2.

In addition to the work amount WL1 as the internal factor, the degree of influence DG1 indicating the degree of influence exerted on the time when the work WR2 is performed next on the work object 2 is input as the external factor to the work management system 1a according to the first modification.

In such a case, a factor that indirectly affects the work amount WL1 from the outside other than the manager can be considered, which is the number of users who utilize or use the work object 2 or work space, the amount of dust or dirt in the work object 2 or work space when the work is cleaning work, and the like. Therefore, the degree of influence exerted on the time or timing at which the work WR2 is performed next on the work object 2 can be considered after the work WR1 is performed on the work object 2.

In addition, in the work management system 1a according to the first modification, the first correction unit 16 compares the degree of influence DG1 input to the second input unit 31 with the first threshold value, and when the degree of influence DG1 exceeds the first threshold value, the first correction unit 16 executes the first correction process of reducing the work amount WL1 estimated by the estimation unit 14. For example, when the dirt on the surface of the work object 2 is excessive and the degree of influence DG1 exceeds the first threshold value, the work amount WL1, which is the work time of the work WR1, can be reduced to ½, for example. Alternatively, for example, when the dirt on the surface of the work object 2 is excessive and the degree of influence DG1 exceeds the first threshold value, the proportion of the portion of the work object 2 to which the fluid 3 is estimated to be blown while the work WR1 is performed can be reduced to ½.

In such a case, since the work amount WL1 performed on the work object 2 can be corrected in consideration of the influence exerted on the time when the work WR2 is performed next, the work amount WL1 performed on the work object 2 can be accurately evaluated.

As illustrated in FIG. 6, the work management system 1a according to the first modification favorably includes a determination unit 32. The determination unit 32 determines the time when the work WR2 is performed such that the time when the work WR2 is performed next on the work object 2 becomes earlier as a first decrease amount when the work amount WL1 is decreased by executing the first correction process by the first correction unit 16 is larger or the work amount WL1 after the first correction process is smaller.

In addition, as illustrated in FIG. 7, in the work management method performed by the work management system 1a according to the first modification, favorably, the determination unit 32 determines the time when the work WR2 is performed such that the time when the work WR2 is performed next on the work object 2 becomes earlier as the first decrease amount when the work amount WL1 is decreased by executing the first correction process by the first correction unit 16 is larger or the work amount WL1 after the first correction process is smaller (step S31 in FIG. 7).

As a result, as the degree of influence DG1 indicating the degree of influence exerted on the time when the work WR2 is performed next on the work object 2 is larger, the time when the work WR2 is performed next on the work object 2 can be made earlier. Therefore, the appropriate time at which the work WR2 is performed can be easily determined according to the number of users who utilize or use the work object 2 or work space, or the amount of dust or dirt in the work object 2 or work space when the work is cleaning work, and the like.

As illustrated in FIG. 6, the work management system 1a according to the first modification favorably includes a third input unit 33 and a second correction unit 34.

The third input unit 33 receives input of a degree of influence DG2 indicating the degree of influence exerted on the time when the work WR3 (see FIG. 3), which is the work, is performed next on the work object 2 after the work WR1 is performed on the work object 2.

The second correction unit 34 compares the degree of influence DG2 input to the third input unit 33 with a second threshold value, and when the degree of influence DG2 exceeds the second threshold value, the second correction unit 34 executes a second correction process of correcting the target passing position TP1 so that the target passing position TP1 set by the setting unit 15 is moved close to the central position of the work object 2 in plan view.

In addition, as illustrated in FIG. 7, in the work management method performed by the work management system 1a according to the first modification, favorably, the third input unit 33 receives input of the degree of influence DG2 indicating the degree of influence exerted on the time when the work WR3 (see FIG. 3), which is the work, is performed next on the work object 2 after the work WR1 is performed on the work object 2 (step S32 in FIG. 7).

Next, the second correction unit 34 compares the degree of influence DG2 input to the third input unit 33 with the second threshold value (step S33 in FIG. 7), and when the degree of influence DG2 exceeds the second threshold value, the second correction unit 34 executes the second correction process of correcting the target passing position TP1 so that the target passing position TP1 set by the setting unit 15 is moved close to the central position of the work object 2 in plan view (step S34 in FIG. 7). By contrast, when the degree of influence DG2 does not exceed the second threshold value, the second correction unit 34 does not execute the second correction process of correcting the target passing position TP1 so that the target passing position TP1 set by the setting unit 15 is moved close to the central position of the work object 2 in plan view.

As described above, it is desirable to grasp, as the external factor, the degree of influence DG2 indicating the degree of influence exerted on the time when the work WR3 is performed next on the work object 2. The external factor is the number of users who utilize or use the work object 2 or work space, the amount of dust or dirt in the work object 2 or work space when the work is cleaning work, and the like. In a case where the external factor changes, it is desirable to change the target passing position TP1 according to the changed external factor.

For example, when the work object 2 or work space includes a plurality of portions and the number of users is small, that is, when the degree of influence DG2 is equal to or smaller than the second threshold value, a portion away from the central position of the work object 2 in plan view, such as a portion close to an entrance, among the plurality of portions, tends to be utilized or used, and a portion close to the central position of the work object 2 in plan view is not often utilized or used. Therefore, it is favorable to correct the target passing position TP1 so that the target passing position TP1 is moved away from the central position of the work object 2 in plan view. As a result, the weighting in evaluating the degree of work performed on the portion away from the central position of the work object 2 in plan view, such as a portion close to an entrance, among the plurality of portions, can be made larger than that on the portion close to the central position of the work object 2 in plan view. Therefore, the work amount WL1 performed on the work object 2 can be more accurately evaluated.

By contrast, for example, when the work object 2 or work space includes the plurality of portions and the number of users is large, that is, when the degree of influence DG2 exceeds the second threshold value, not only the portion away from the central position of the work object 2 in plan view, such as a portion close to an entrance, among the plurality of portions, but also the portion close to the central position of the work object 2 in plan view are utilized or used. Therefore, it is favorable to correct the target passing position TP1 so that the target passing position TP1 is moved close to the central position of the work object 2 in plan view. As a result, the weighting in evaluating the degree of work performed on the portion close to the central position of the work object 2 in plan view can be made larger than that on the portion away from the central position of the work object 2 in plan view, such as a portion close to an entrance, among the plurality of portions. Therefore, the work amount WL1 performed on the work object 2 can be more accurately evaluated.

Alternatively, a case is considered in which, for example, when the work object 2 or work space includes the plurality of portions and the number of users is small, that is, when the degree of influence DG2 is equal to or smaller than the second threshold value, not only the portion away from the central position of the work object 2 in plan view, such as a portion close to an entrance, among the plurality of portions, but also the portion close to the central position of the work object 2 in plan view are utilized or used due to the nature of the work. In such a case, it is favorable to correct the target passing position TP1 so that the target passing position TP1 is moved close to the central position of the work object 2 in plan view. As a result, the weighting in evaluating the degree of work performed on the portion close to the central position of the work object 2 in plan view can be made larger than that on the portion away from the central position of the work object 2 in plan view, such as a portion close to an entrance, among the plurality of portions. Therefore, the work amount WL1 performed on the work object 2 can be more accurately evaluated.

By contrast, a case is considered in which, for example, when the work object 2 or work space includes the plurality of portions and the number of users is large, that is, when the degree of influence DG2 exceeds the second threshold value, the portion away from the central position of the work object 2 in plan view, such as a portion close to an entrance, among the plurality of portions, tends to be utilized or used, and a portion close to the central position of the work object 2 in plan view is not often utilized or used due to the nature of the work. In such a case, it is favorable to correct the target passing position TP1 so that the target passing position TP1 is moved away from the central position of the work object 2 in plan view. As a result, the weighting in evaluating the degree of work performed on the portion away from the central position of the work object 2 in plan view, such as a portion close to an entrance, among the plurality of portions, can be made larger than that on the portion close to the central position of the work object 2 in plan view. Therefore, the work amount WL1 performed on the work object 2 can be more accurately evaluated.

Second Modification of Work Management System

Next, a second modification of the work management system according to the first embodiment will be described.

Figure 8:
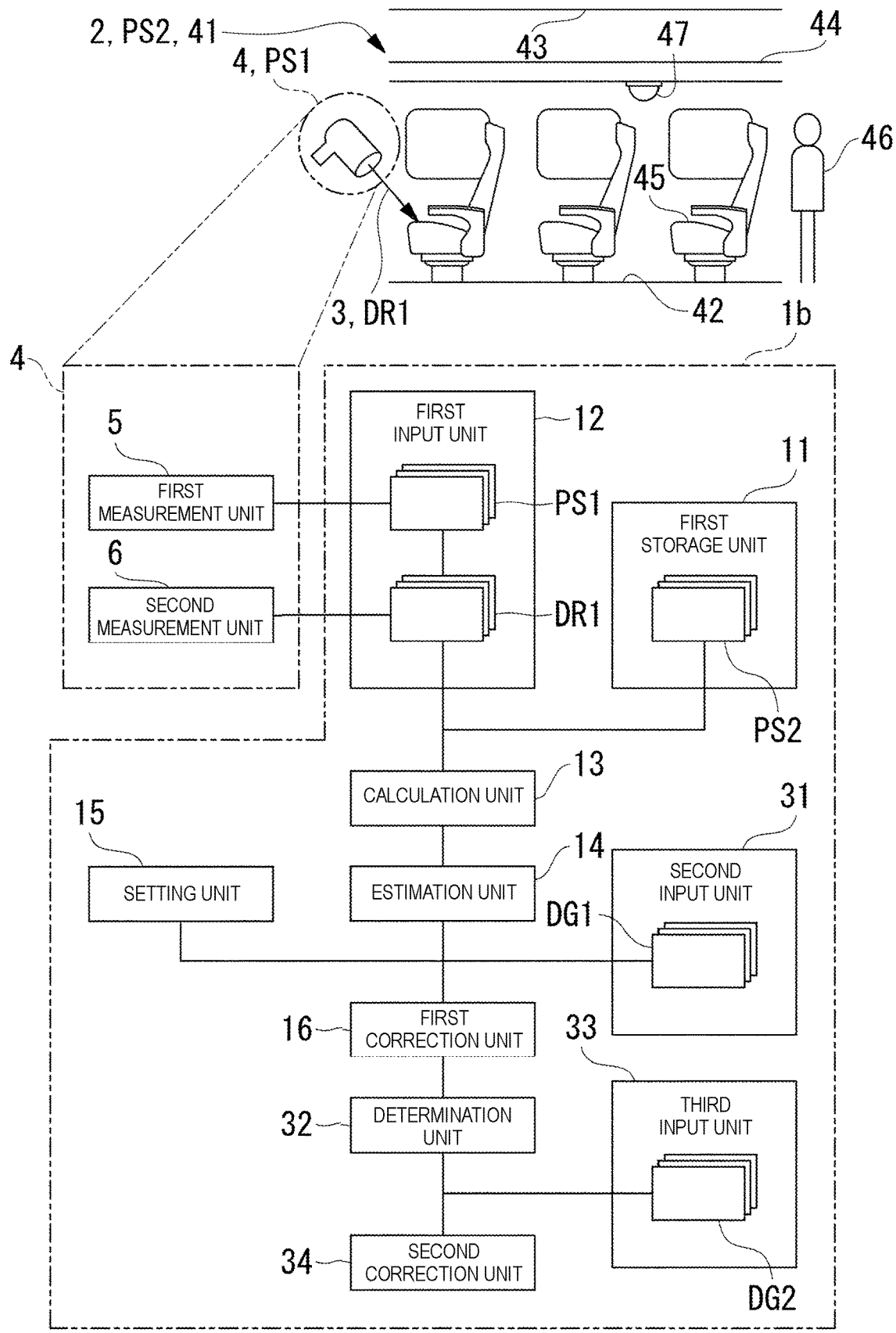
FIG. 8 is a diagram for explaining a work management method performed by a work management system according to a second modification of the first embodiment.

FIG. 8 is a diagram for explaining a work management method performed by the work management system according to the second modification of the first embodiment.

As illustrated in FIG. 8, a work management system 1*b* according to the second modification is a modification in which the work management system 1*a* according to the first modification of the first embodiment is applied to a work management system that manages cleaning work. That is, the work management system 1*b* according to the second modification is a work management system that manages cleaning work that is work performed by blowing the fluid 3 to the work object 2 to blow off dust or dirt on the surface of the work object 2 by using the fluid blowing device 4 that is moving. The work management system 1*b* according to the second modification may be a work management system that manages sterilization work that is work performed by blowing the fluid 3 containing a chemical solution for sterilization or disinfection to the work object 2 to sterilize or disinfect the work object 2 by using the fluid blowing device 4 that is moving.

FIG. 8 illustrates, as an example, an example in which the work object 2 is a vehicle interior space 41 of a train. In the example illustrated in FIG. 8, the vehicle interior space 41 that is the work object 2 includes a floor 42, a ceiling 43, a baggage rack 44, a seat 45, and the like.

As illustrated in FIG. 8, in the work management system 1*b* according to the second modification, the degree of influence DG1 is at least one selected from the group consisting of the number of users 46 who have used the work object 2, the time during which the user 46 has used the work object 2, and the amount of dust or dirt on the surface of the work object 2. For example, the degree of influence DG1 can be acquired by performing image analysis on an image captured by an imaging device 47 such as a camera installed in the vehicle interior space 41 that is the work object 2 using a computer (acquisition unit) (not illustrated).

As described above, it is desirable to grasp, as the external factor, the degree of influence DG1 indicating the degree of influence exerted on the time when the work WR2 (see FIG. 3) is performed next on the work object 2. The external factor is a factor that indirectly affects the work amount WL1 (see FIG. 3) from the outside other than the manager. The number of users 46 who have used the work object 2, the time during which the user 46 has used the work object 2, and the amount of dust or dirt on the surface of the work object 2 are significant external factors as the degree of influence DG1 in managing the cleaning work. Therefore, with the work management system 1*b* according to the second modification, the work of the cleaning work performed on the work object 2 can be more accurately evaluated, and the appropriate time when the next cleaning work is performed can be easily determined.

Favorably, the blower described above with reference to FIG. 5 can be used as the fluid blowing device 4.

In such a case, in a step corresponding to step S21 in FIG. 7, the first storage unit 11 stores the position PS2, which is a position on the surface of the work object 2, similarly to step S1 in FIG. 2.

In a step corresponding to step S23 in FIG. 7, similarly to step S3 in FIG. 2, the calculation unit 13 calculates, as the position PS3, the position PS5 (see FIG. 3), which is the position of a portion located on the axis AX1 (see FIG. 3) passing through the position PS4 (see FIG. 3) and extending in the direction DR2 (see FIG. 3) on the surface of the work object 2, on the basis of the position PS2, the position PS4, and the direction DR2 where, for each of the plurality of time points, the position PS4 is the position PS1 measured at a certain time point and the direction DR2 is the direction DR1 measured at the certain time point.

By such a method, the position PS3 of the portion of the work object 2 to which the fluid 3 is estimated to be blown while the work WR1 is performed can be easily calculated with high accuracy.

In the work management method performed by the work management system 1b according to the second modification, for example, the following steps (1-1) to (1-5) can be performed.

(1-1) Data on the position PS3 of the work object 2 is registered in 3D in advance. First, data on the incomplete position PS3 may be registered, and the data on the position PS3 may be gradually updated while the cleaning work is repeatedly performed.

(1-2) For example, in a case where the fluid blowing device 4 that performs cleaning work in an unmanned manner by a robot, that is, a cleaning work robot is used, which portion of the work object 2 is to be cleaned at which time is set as an internal factor, and a schedule of future cleaning work is created with reference to a history of the performed cleaning work. When the cleaning work robot is used, the history of the performed cleaning work and the schedule of the future cleaning work are referred to, but a history of cleaning work performed by a worker can also be referred to.

(1-3) As an internal factor, on the work object 2, information on a portion where the cleaning work by the cleaning work robot has been performed (worked area), a portion where the cleaning work by the cleaning work robot has not been performed (unworked area), a portion where the cleaning work by the worker has been performed (worked area), and a portion where the cleaning work by the worker has not been performed (unworked area) is recorded in the work management system as data such as an image. In addition, as an internal factor, information indicating when and by which cleaning tool or cleaning method these various cleaning work are performed is recorded in the work management system as data such as an image. Then, while visually recognizing the recorded information, the worker can perform the cleaning work around a portion where the cleaning work by the worker has not been sufficiently performed when the previous work was performed, a portion where the dirt amount is large due to an external factor, or a portion where the cleaning work by the cleaning work robot has not been sufficiently performed or has not been performed at all. At that time, information about the cleaning work by the worker is newly added and updated as data on the position PS3, and is newly registered in 3D.

(1-4) Data on the external factor in the period in which (1-2) and (1-3) above are performed, that is, the management period of the work object 2, is acquired. For example, data such as the number of users 46, the time during which the user 46 has used the work object 2, the movement path of the user 46, or the amount of dust or dirt on the surface of the work object 2 is acquired by a sensor or the like of the imaging device 47 and the like.

(1-5) Data on the cleaning work by the cleaning work robot and the cleaning work by the worker in (1-2) and (1-3) above as an internal factor and the degree of influence by the user 46, the environment, and the like in (1-4) above as an external factor are comprehensively analyzed, the cost-effectiveness of the cleaning work in the management period of the work object 2 is analyzed, and a plan of the future cleaning work can be created.

Third Modification of Work Management System

Figure 9:
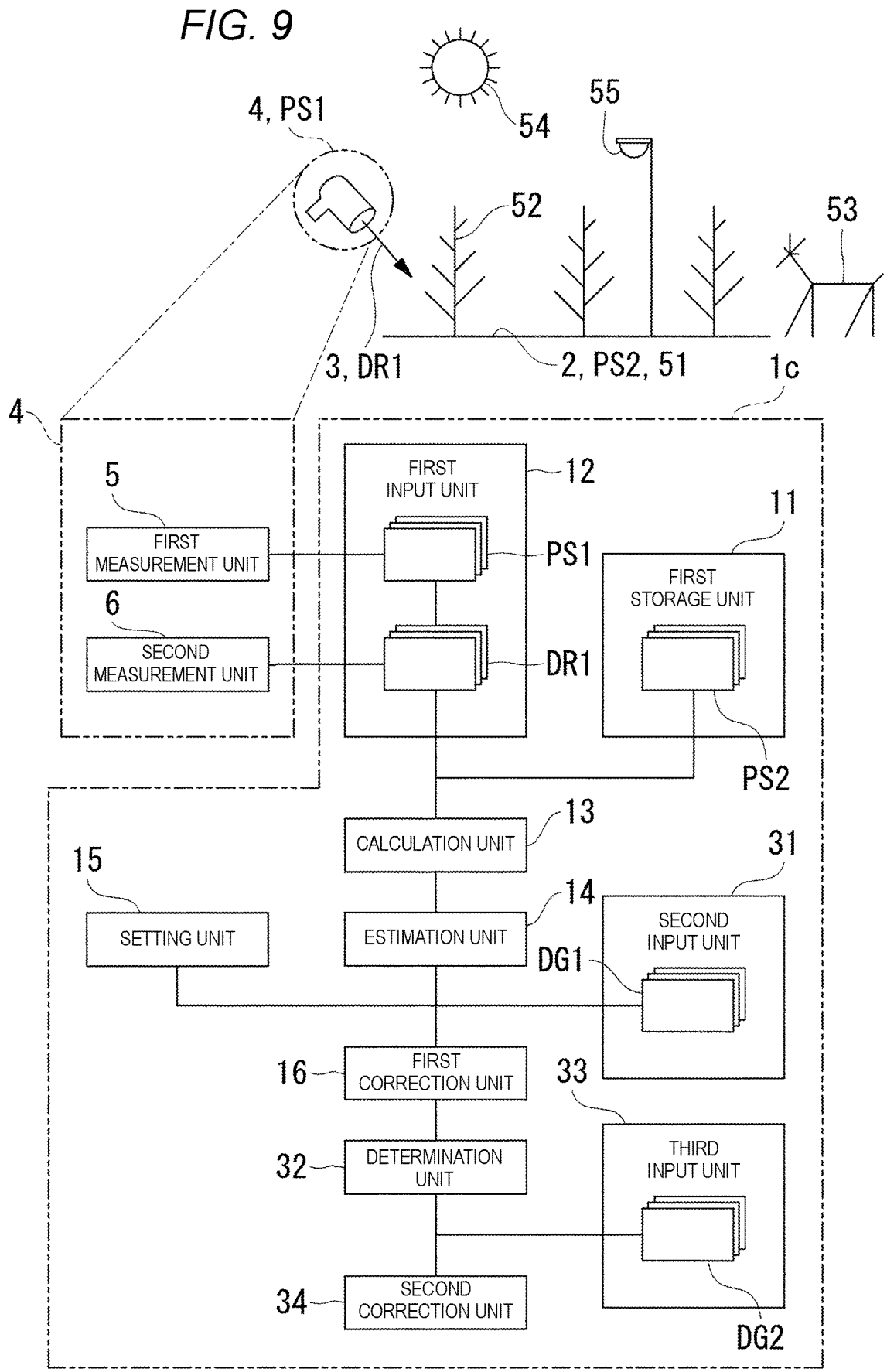
FIG. 9 is a diagram for explaining a work management method performed by a work management system according to a third modification of the first embodiment.

Next, a third modification of the work management system according to the first embodiment will be described. FIG. 9 is a diagram for explaining a work management method performed by the work management system according to the third modification of the first embodiment.

As illustrated in FIG. 9, a work management system 1c according to the third modification is a modification in which the work management system 1a according to the first modification of the first embodiment is applied to a work management system that manages agricultural work. That is, in the work management system 1c according to the third modification, the work object 2 is an agricultural land 51. In addition, the work management system 1c according to the third modification is a work management system that manages agricultural work that is work performed by blowing the fluid 3 containing an agricultural chemical or water to the agricultural land 51 or an agricultural crop 52 by using the fluid blowing device 4 that is moving.

As illustrated in FIG. 9, in the work management system 1c according to the third modification, the degree of influence DG1 is at least one selected from the group consisting of the number of invading bodies 53 including humans, vermin, or insect pests that have intruded into the agricultural land 51, the time during which the invading body 53 has intruded into the agricultural land 51, the distance by which the invading body 53 has moved in the agricultural land 51, and weather information 54 on the agricultural land 51. For example, the degree of influence DG1 can be acquired by performing image analysis on an image captured by an imaging device 55 such as a camera installed in the agricultural land 51 that is the work object 2 using a computer (acquisition unit) (not illustrated).

As described above, it is desirable to grasp, as an external factor, the degree of influence DG1 indicating the degree of influence exerted on the time when agricultural work is performed next on the agricultural land 51. Here, the external factor in the third modification is a factor that indirectly affects the work amount WL1 (see FIG. 3) from the outside other than a manager of the agricultural land 51. The number of invading bodies 53 including humans, vermin, or insect pests that have intruded into the agricultural land 51, the time during which the invading body 53 has intruded into the agricultural land 51, the distance by which the invading body 53 has moved in the agricultural land 51, and the weather information 54 on the agricultural land 51 are significant external factors as the degree of influence DG1 in managing agricultural work. Therefore, with the work management system 1c according to the third modification, the agricultural work performed on the agricultural land 51 can be more accurately evaluated, and the appropriate time when the next agricultural work is performed can be easily determined.

In the work management method performed by the work management system 1c according to the third modification, for example, the following steps (2-1) to (2-5) can be performed.

(2-1) Data on the position PS3 of the agricultural land 51 that is the work object 2 is registered in 3D in advance. First, data on the incomplete position PS3 may be registered, and the data on the position PS3 may be gradually completed while the agricultural work is repeatedly performed.

(2-2) For example, in a case where the fluid blowing device 4 that performs agricultural work in an unmanned manner by a robot, that is, an agricultural work robot is used, which portion of the agricultural land 51 that is the work object 2 is subjected to the agricultural work at which time is set as an internal factor, and a schedule of future agricultural work is created with reference to a history of the performed agricultural work. When the agricultural work robot is used, the history of the performed agricultural work and the schedule of the future agricultural work are referred to, but a history of agricultural work performed by a worker can also be referred to.

(2-3) As an internal factor, on the agricultural land 51 that is the work object 2, information on a portion where the agricultural work by the agricultural work robot has been performed (worked area), a portion where the agricultural work by the agricultural work robot has not been performed (unworked area), a portion where the agricultural work by the worker has been performed (worked area), and a portion where the agricultural work by the worker has not been performed (unworked area) is recorded in the work management system as data such as an image. In addition, as an internal factor, information indicating when and by which agricultural tool or agricultural method the various agricultural work is performed is recorded in the work management system as data such as an image. Then, while visually recognizing the recorded information, the worker can perform the agricultural work around a portion where the agricultural work by the worker has not been sufficiently performed when the previous work was performed, a portion where the vermin or insect pests have a large influence due to an external factor, or a portion where the agricultural work by the agricultural work robot has not been sufficiently performed or has not been performed at all. At that time, information about the agricultural work by the worker is newly added and updated as data on the position PS3, and is newly registered in 3D.

(2-4) Data on the external factor in the period in which (2-2) and (2-3) above are performed, that is, the management period of the work object 2, is acquired. For example, data such as the number of invading bodies 53 including external humans, vermin, or insect pests, the time during which the invading body 53 has entered the agricultural land 51 that is the work object 2, the movement path of the invading body 53, or the amount of damage or dirt of the agricultural crop 52 in the agricultural land 51 is acquired by a sensor or the like of the imaging device 55 or the like. Furthermore, data on weather information about the agricultural land 51 such as sunshine time, wind direction, wind speed, precipitation amount, or snowfall amount is acquired by a sensor or the like of the imaging device 55 or the like.

(2-5) Data on the agricultural work by the agricultural work robot and the agricultural work by the worker in (2-2) and (2-3) above as an internal factor and the degree of influence by the environment and the invading bodies 53 including external humans, vermin, or insect pests, and the like in (2-4) above as an external factor are comprehensively analyzed, the cost-effectiveness of the agricultural work in the management period of the agricultural land 51 that is the work object 2 is analyzed, and a plan of the future agricultural work can be created.

Fourth Modification of Work Management System

Figure 10:
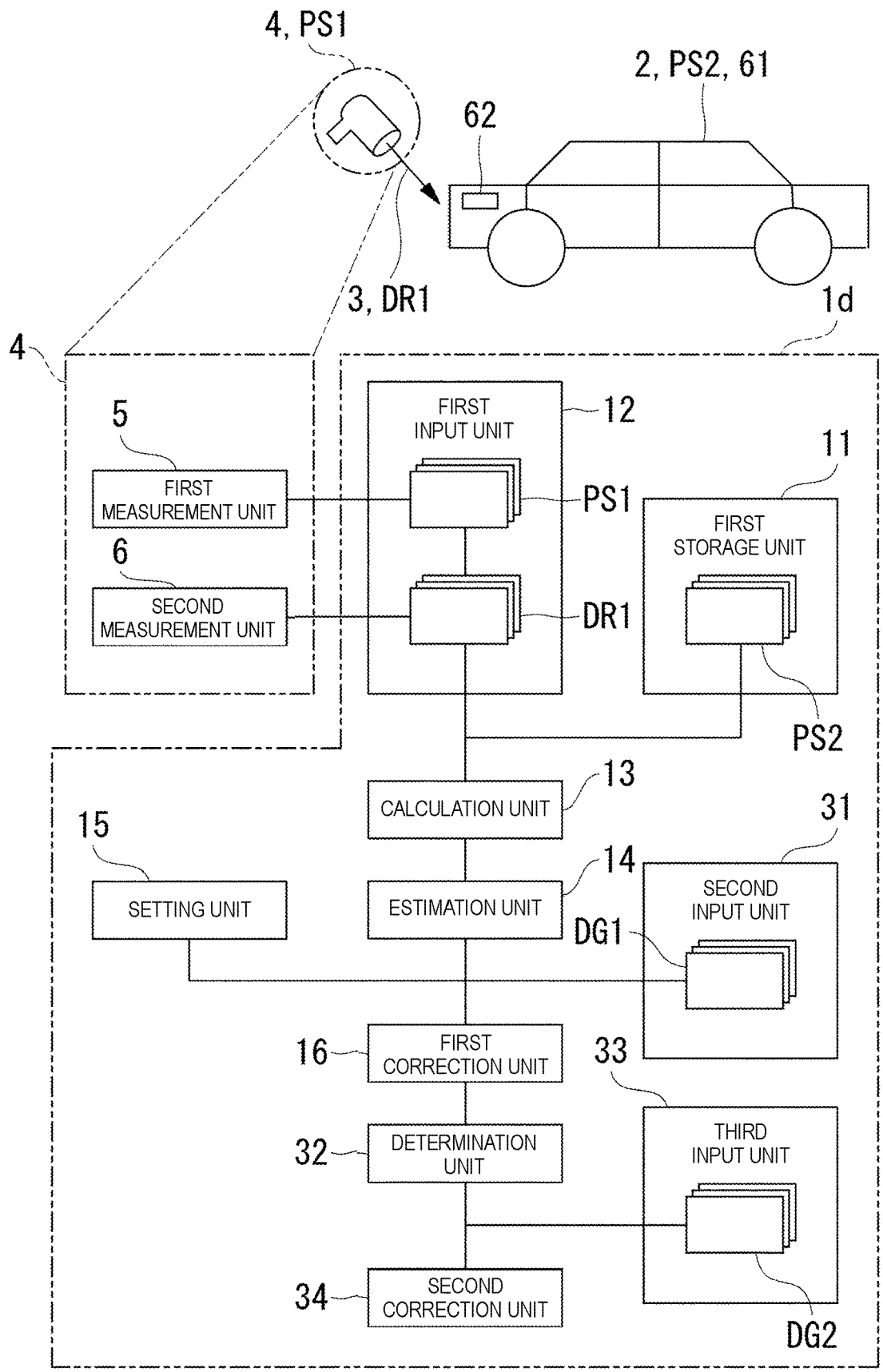
FIG. 10 is a diagram for explaining a work management method performed by a work management system according to a fourth modification of the first embodiment.

Next, a fourth modification of the work management system according to the first embodiment will be described. FIG. 10 is a diagram for explaining a work management method performed by the work management system according to the fourth modification of the first embodiment.

As illustrated in FIG. 10, a work management system 1d according to the fourth modification is a modification in which the work management system 1a according to the first modification of the first embodiment is applied to a work management system that manages maintenance work on a machine. That is, in the work management system 1d according to the fourth modification, the work object 2 is a machine 61. In addition, the work management system 1d according to the fourth modification is a work management system that manages maintenance work that is work performed by blowing the fluid 3 to the machine 61 by using the fluid blowing device 4 that is moving.

As illustrated in FIG. 10, in the work management system 1d according to the fourth modification, the degree of influence DG1 is at least one selected from the group consisting of the time during which the machine 61 has operated, the distance by which the machine 61 has moved when the machine 61 is movable, the time during which a malfunction has occurred in the machine 61, and the type of the malfunction that has occurred in the machine 61. For example, the degree of influence DG1 can be acquired by various sensors 62 installed in the machine 61 that is the work object 2.

As described above, it is desirable to grasp, as an external factor, the degree of influence DG1 indicating the degree of influence exerted on the time when maintenance work is performed next on the machine 61. Here, the external factor in the fourth modification is a factor that indirectly affects the work amount WL1 (see FIG. 3) from the outside other than a manager of the machine 61. The time during which the machine 61 has operated, the distance by which the machine 61 has moved when the machine 61 is movable, the time during which the malfunction has occurred in the machine 61, and the type of the malfunction that has occurred in the machine 61 are significant external factors as the degree of influence DG1 in managing maintenance work. Therefore, with the work management system 1d of the fourth modification, the maintenance work performed on the machine 61 can be more accurately evaluated, and the appropriate time when the next maintenance work is performed can be easily determined.

Examples of the machine 61 that is the work object 2 in the fourth modification include various machines such as machine tools, airplanes, automobiles, trains, factory automation, factory machines, and elevators. In addition, in the work management method performed by the work management system 1d according to the fourth modification, as the maintenance work of blowing the fluid 3, there is work of blowing the fluid 3 containing a paint, a disinfectant, or an oil by spraying or the like. In addition, in the work management method performed by the work management system 1d according to the fourth modification, for example, the following steps (3-1) to (3-3) can be performed.

(3-1) Even when the machine 61 that is the work object 2 is an elevator, an airplane, and the like, data on the position PS3 of the machine 61 is registered in 3D.

(3-2) As an internal factor, on the machine 61 that is the work object 2, information on a portion where the maintenance work by the fluid blowing device 4 that performs maintenance work in an unmanned manner by a robot, that is, a maintenance work robot, has been performed (worked area), a portion where the maintenance work by the maintenance work robot has not been performed (unworked area), a portion where the maintenance work by a worker has been performed (worked area), and a portion where the maintenance work by the worker has not been performed (unworked area) is recorded in the work management system as data such as an image.

(3-3) Data on the maintenance work by the maintenance work robot and the maintenance work by the worker in (3-1) above as internal factors and the external factor are comprehensively analyzed.

Second Embodiment

Work Management System

Figure 11:
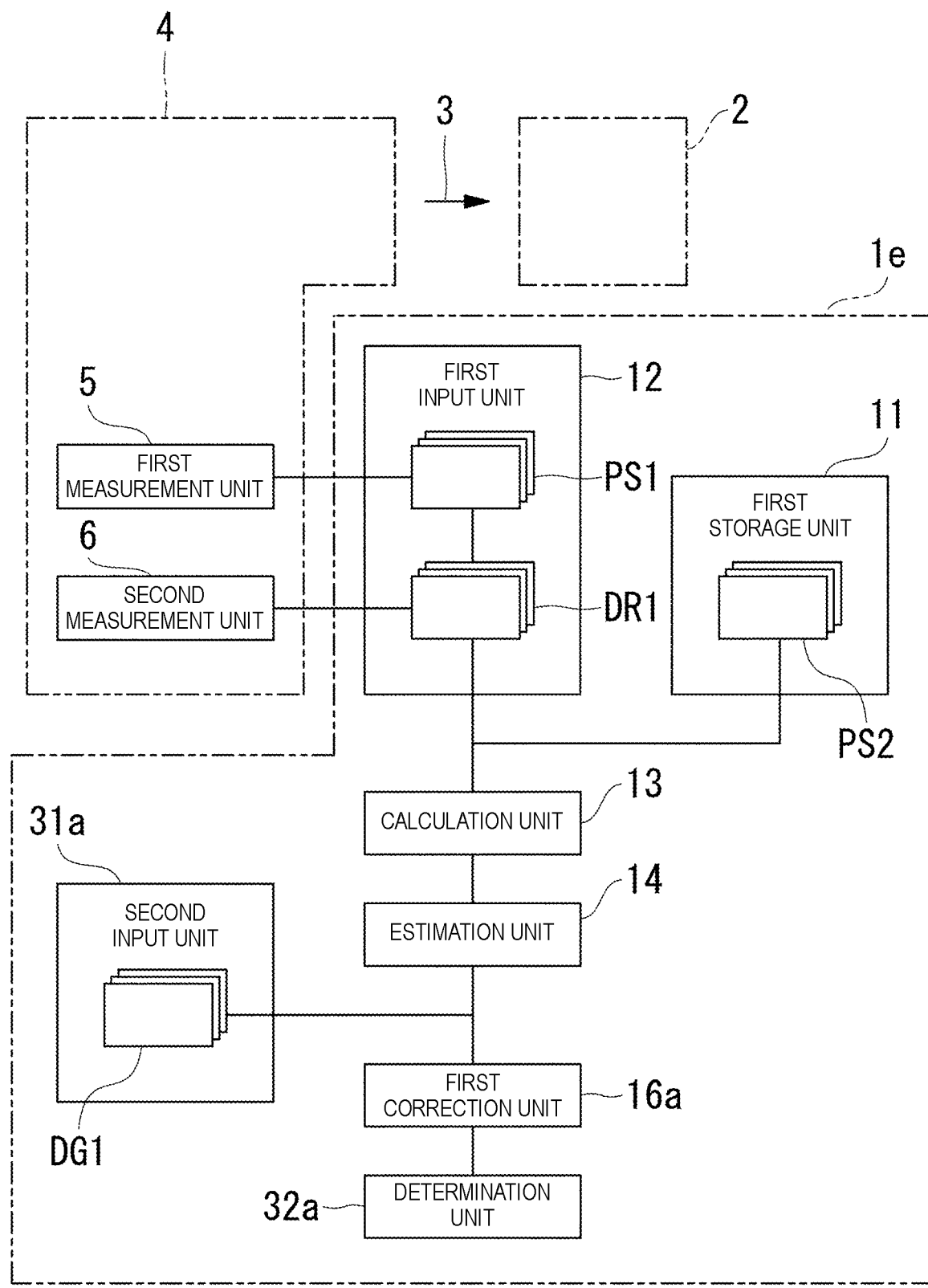
FIG. 11 is a block diagram illustrating a configuration of a work management system according to a second embodiment.

Next, a work management system according to a second embodiment, which is an embodiment of the present invention, will be described. FIG. 11 is a block diagram illustrating a configuration of the work management system according to the second embodiment.

As illustrated in FIG. 11, similarly to the work management system 1 of the first embodiment, a work management system 1e according to the second embodiment is a work management system that manages work performed by moving the fluid blowing device 4 that blows the fluid 3 to the work object 2 and blowing the fluid 3 to the work object 2 by using the fluid blowing device 4 that is moving.

As illustrated in FIG. 1, in the work management system 1 according to the first embodiment, the first correction unit 16 determines whether the fluid blowing device 4 has passed through the target passing position TP1 (see FIG. 3), and the first correction unit 16 executes the first correction process of reducing the work amount WL1 (see FIG. 3) estimated by the estimation unit 14 when it is determined that the fluid blowing device 4 has not passed through the target passing position TP1 while the work WR1 (see FIG. 3) is performed.

By contrast, unlike the work management system 1 according to the first embodiment, the work management system 1e according to the second embodiment does not determine whether the fluid blowing device 4 has passed through the target passing position TP1 (see FIG. 3).

As illustrated in FIG. 11, a fluid blowing device similar to the fluid blowing device 4 according to the first embodiment can be used as the fluid blowing device 4 according to the second embodiment, and the fluid blowing device 4 according to the second embodiment includes the first measurement unit 5 and the second measurement unit 6. The first measurement unit 5 measures the position PS1 that is a position of the fluid blowing device 4. The second measurement unit 6 measures the direction DR1 in which the fluid 3 is blown out from the fluid blowing device 4.

As illustrated in FIG. 11, similarly to the work management system 1 according to the first embodiment, the work management system 1e according to the second embodiment includes the first storage unit 11, the first input unit 12, the calculation unit 13, and the estimation unit 14.

Also in the second embodiment, similarly to the first embodiment, the first storage unit 11 stores the position PS2 that is a position of the work object 2.

Also in the second embodiment, similarly to the first embodiment, the first input unit 12 receives input of the plurality of positions PS1 measured by the first measurement unit 5 at the plurality of time points and the plurality of directions DR1 measured by the second measurement unit 6 at the plurality of time points while the work WR1 (see FIG. 3), which is work, is performed on the work object 2.

Also in the second embodiment, similarly to the first embodiment, the calculation unit 13 calculates the position PS3, which is the position of a portion of the work object 2 to which the fluid 3 is estimated to be blown while the work WR1 (see FIG. 3) is performed, on the basis of the position PS2 stored in the first storage unit 11 and the plurality of positions PS1 and the plurality of directions DR1 input to the first input unit 12.

Also in the second embodiment, similarly to the first embodiment, the estimation unit 14 estimates the work amount WL1 (see FIG. 3), which is a work amount of the work WR1 (see FIG. 3) performed on the work object 2, on the basis of the position PS3 (see FIG. 3) calculated by the calculation unit 13.

By contrast, unlike the work management system 1 according to the first embodiment, the work management system 1e according to the second embodiment includes a second input unit 31a instead of the setting unit 15 (see FIG. 1). As the second input unit 31a included in the work management system 1e according to the second embodiment, an input unit similar to the second input unit 31 (see FIG. 6) included in the work management system 1a according to the first modification of the first embodiment can be used.

Also in the second embodiment, similarly to the first modification of the first embodiment, the second input unit 31a receives input of the degree of influence DG1 indicating the degree of influence exerted on the time when the work WR2 (see FIG. 3), which is the work, is performed next on the work object 2 after the work WR1 (see FIG. 3) is performed on the work object 2.

Although the work management system 1e according to the second embodiment includes a first correction unit 16a similarly to the work management system 1 according to the first embodiment, the function of the first correction unit 16a included in the work management system 1e according to the second embodiment is different from the function of the first correction unit 16 (see FIG. 1) included in the work management system 1 according to the first embodiment.

Unlike the first correction unit 16 (see FIG. 1) included in the work management system 1 according to the first embodiment, the first correction unit 16a included in the work management system 1e according to the second embodiment compares the degree of influence DG1 input to the second input unit 31a with the first threshold value, and when the degree of influence DG1 exceeds the first threshold value, the first correction unit 16 executes the first correction process of reducing the work amount WL1 (see FIG. 3) estimated by the estimation unit 14.

A computer can be used as the work management system 1e according to the second embodiment similarly to the work management system 1 according to the first embodiment. In such a case, as the first storage unit 11, the first input unit 12, the calculation unit 13, the estimation unit 14, the second input unit 31a, and the first correction unit 16a, one computer can be used, a plurality of computers connected to each other can be used, or a plurality of stand-alone computers can be used. The details of the computer are the same as those of the first embodiment, and thus the description thereof will be omitted.

Figure 12:
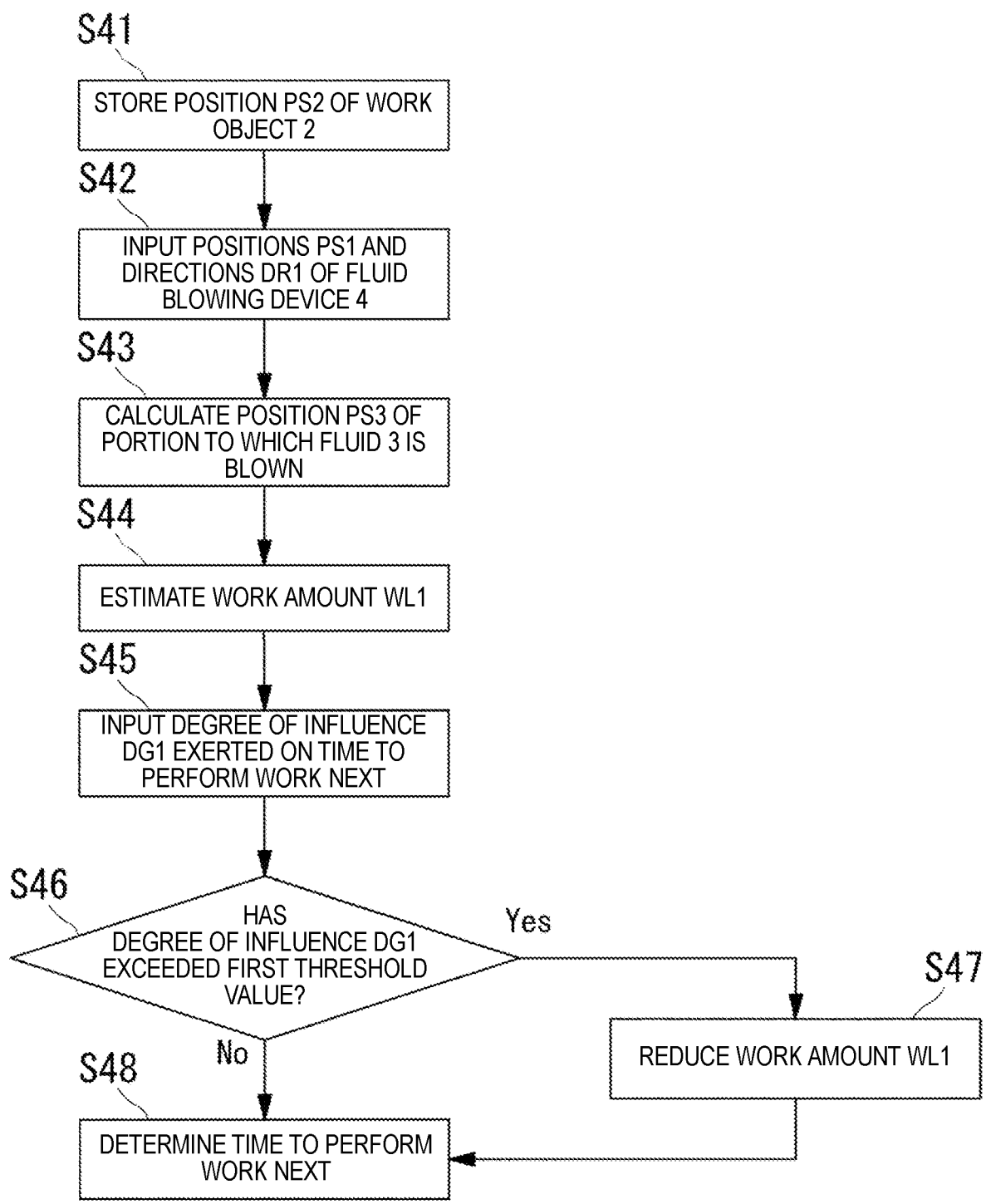
FIG. 12 is a flowchart illustrating some steps of an example of a work management method performed by the work management system according to the second embodiment.

Next, a work management method performed by the work management system 1e according to the second embodiment will be described. FIG. 12 is a flowchart illustrating some steps of an example of the work management method performed by the work management system according to the second embodiment.

First, similarly to the first embodiment, a step corresponding to step S1 in FIG. 2 is performed. The first storage unit 11 stores the position PS2 that is a position of the work object 2 (step S41 in FIG. 12). Specifically, in step S41, for example, plane data (2D data) or three-dimensional data (3D data) of the work object 2 on which work is performed, that is, a work space to be a target of management or maintenance work, is acquired and registered in advance.

Next, similarly to the first embodiment, a step corresponding to step S2 in FIG. 2 is performed. The first input unit 12 receives input of the plurality of positions PS1 measured by the first measurement unit 5 at the plurality of time points and the plurality of directions DR1 measured by the second measurement unit 6 at the plurality of time points while the work WR1 (see FIG. 3), which is work, is performed on the work object 2 (step S42 in FIG. 4). Step S42 is favorably performed by a computer installed at a work site that is a place away from a place where a computer in which steps other than step S42 among steps S41 to S46 are performed is installed. Therefore, the computer used as the first input unit 12 is favorably a computer different from the computer used as the first storage unit 11, the calculation unit 13, the estimation unit 14, the second input unit 31a, and the first correction unit 16a.

Next, similarly to the first embodiment, a step corresponding to step S3 in FIG. 2 is performed. The calculation unit 13 calculates the position PS3, which is the position of a portion of the work object 2 to which the fluid 3 is estimated to be blown while the work WR1 (see FIG. 3) is performed, on the basis of the position PS2 stored by the first storage unit 11 and the plurality of positions PS1 and the plurality of directions DR1 input to the first input unit 12 (step S43 in FIG. 12).

Next, similarly to the first embodiment, a step corresponding to step S4 in FIG. 2 is performed. The estimation unit 14 estimates the work amount WL1, which is a work amount of the work WR1 (see FIG. 3) performed on the work object 2, on the basis of the position PS3 calculated by the calculation unit 13 (step S44 in FIG. 12).

By contrast, in the second embodiment, unlike the first embodiment, the second input unit 31a receives input of the degree of influence DG1 indicating the degree of influence exerted on the time when the work WR2 (see FIG. 3), which is the work, is performed next on the work object 2 after the work WR1 (see FIG. 3) is performed on the work object 2 (step S45 in FIG. 12).

Next, in the second embodiment, unlike the first embodiment, the first correction unit 16a compares the degree of influence DG1 input to the second input unit 31a with the first threshold value (step S46 in FIG. 12), and when the degree of influence DG1 exceeds the first threshold value, the first correction unit 16a executes the first correction process of reducing the work amount WL1 estimated by the estimation unit 14 (step S47 in FIG. 12). By contrast, when the degree of influence DG1 does not exceed the first threshold value, the first correction unit 16 does not execute the first correction process of reducing the work amount WL1 estimated by the estimation unit 14.

Here, problems of a work management system that manages work performed by blowing a fluid to a work object by using a fluid blowing device will be described.

First, general problems of conventional work management systems are similar to the problems described in the first embodiment.

Next, problems of the work management system that manages work performed by blowing the fluid to the work object by using the fluid blowing device will be described.

For example, a case is considered in which a position of the work object is stored, a position of the fluid blowing device and a direction in which the fluid is blown out are measured, a position of a portion of the work object to which the fluid is blown is calculated on the basis of the stored position of the work object and the measured position of the fluid blowing device and the direction in which the fluid is blown, and a work amount of the performed work is estimated.

In such a case, the position of the portion of the work object to which the fluid is estimated to be blown can be calculated on the basis of the stored position of the work object, the position of the fluid blowing device, and the direction in which the fluid is blown.

Here, the position of the portion of the work object to which the fluid is estimated to be blown is calculated to accurately evaluate the work amount performed on the work object, and the work amount performed on the work object is accurately evaluated to determine the time when the work is performed next.

However, in order to determine the time when the work is performed next, as the influence exerted on the time when the work is performed next, the degree of influence DG1, which is an external factor, indicating the degree of influence exerted on the time when the work WR2 (see FIG. 3), which is the work, is performed next on the work object 2 may have to be emphasized more than the work amount WL1, which is an internal factor. For example, when, as the degree of influence DG1, the number of users who utilize or use the work object 2 or work space, or the amount of dust or dirt in the work object 2 or work space when the work is cleaning work, is extremely large, the degree of influence DG1 has to be emphasized rather than how the work is performed. In such a case, it is desirable to correct the work amount WL1 in consideration of the degree of influence DG1 indicating the degree of influence exerted on the time when the work WR2 is performed next rather than whether the fluid blowing device 4 has passed through the target passing position TP1 while the work WR1 (see FIG. 3) is performed.

Thus, as a method of accurately evaluating the work amount WL1 performed on the work object 2, it may be desirable to correct the work amount WL1 in consideration of the influence exerted on the time when the work WR2 (see FIG. 3) is performed next after the work WR1 (see FIG. 3) is performed by blowing the fluid 3 to the work object 2 by using the fluid blowing device 4.

As described above, the internal factor is a factor that directly affects the work amount WL1 from the inside on a manager side due to the behavior of the manager who manages the work object 2 or manages a worker performing the work on the work object 2.

The external factor is the number of users who utilize or use the work object 2 or work space, the amount of dust or dirt in the work object 2 or work space when the work is cleaning work, and the like, and is a factor that indirectly affects the work amount WL1 from the outside other than the manager. In other words, the external factor represents the degree of influence exerted on the time or timing at which the work WR2 (see FIG. 3) is performed next on the work object 2 after the work WR1 (see FIG. 3) is performed on the work object 2.

In the technique described in JP 2016-149024 A, a captured image of a predetermined area is acquired, and when a cleaning member is detected in the acquired captured image, an evaluation value regarding cleaning in the predetermined area is calculated according to a change in a detection position of the cleaning member. However, the technique described in JP 2016-149024 A does not correct the work amount WL1 of the work WR1 (see FIG. 3) in consideration of the influence exerted on the time when the work WR2 (see FIG. 3) is performed next after the work WR1 (see FIG. 3) is performed by blowing the fluid 3 to the work object 2 by using the fluid blowing device 4. Therefore, in the technique described in JP 2016-149024 A, it is difficult to accurately evaluate the work amount WL1 performed on the work object 2 when the degree of influence DG1 is large.

In the technique described in JP 2015-27345 A, a movement history in a cleaning target area at the time of performing cleaning is detected on the basis of a temporal change of a cleaning position detected by a cleaning position detection unit, and a cleaned area where cleaning has been performed in the cleaning target area is detected on the basis of the detected movement history. However, the technique described in JP 2015-27345 A does not correct the work amount WL1 of the work WR1 in consideration of the influence exerted on the time when the work WR2 (see FIG. 3) is performed next after the work WR1 (see FIG. 3) is performed by blowing the fluid 3 to the work object 2 by using the fluid blowing device 4. Therefore, in the technique described in JP 2015-27345 A, it is difficult to accurately evaluate the work amount WL1 performed on the work object 2 when the degree of influence DG1 is large.

In the technique described in JP 2021-39576 A, operation history information indicating an operation history of each of at least one device installed in a room is acquired, load result information indicating a cleaning load that is a work load required for cleaning the room is acquired, and the cleaning load when the room is cleaned after a user has stayed in the room is obtained on the basis of the operation history information and the load result information. However, the technique described in JP 2021-39576 A does not correct the work amount WL1 of the work WR1 in consideration of the influence exerted on the time when the work WR2 (see FIG. 3) is performed next after the work WR1 (see FIG. 3) is performed by blowing the fluid 3 to the work object 2 by using the fluid blowing device 4. Therefore, in the technique described in JP 2021-39576 A, it is difficult to accurately evaluate the work amount WL1 performed on the work object 2 when the degree of influence DG1 is large.

By contrast, the work management system 1e according to the second embodiment includes the first storage unit 11, the first input unit 12, the calculation unit 13, and the estimation unit 14 similarly to the work management system 1 according to the first embodiment, and further includes the second input unit 31a unlike the work management system 1 according to the first embodiment. Although the work management system 1e according to the second embodiment includes the first correction unit 16a similarly to the work management system 1 according to the first embodiment, the function of the first correction unit 16a included in the work management system 1e according to the second embodiment is different from the function of the first correction unit 16 included in the work management system 1 according to the first embodiment. The calculation unit 13 calculates the position PS3 that is the position of a portion of the work object 2 to which the fluid 3 is estimated to be blown while the work WR1 is performed, on the basis of the position PS2 stored by the first storage unit 11 and the plurality of positions PS1 and the plurality of directions DR1 input to the first input unit 12, and the estimation unit 14 estimates the work amount WL1 of the work WR1 performed on the work object 2 on the basis of the calculated position PS3. In addition, the first correction unit 16a compares the first threshold value with the degree of influence DG1, which is the degree of influence DG1 input to the second input unit 31a and indicates the degree of influence exerted on the time when the work WR2 is performed next on the work object 2 after the work WR1 is performed on the work object 2, and when the degree of influence DG1 exceeds the first threshold value, the first correction unit 16a executes the first correction process of reducing the work amount WL1 estimated by the estimation unit 14.

In such a case, a factor that indirectly affects the work amount WL1 from the outside other than the manager can be considered, which is the number of users who utilize or use the work object 2 or work space, the amount of dust or dirt in the work object 2 or work space when the work is cleaning work, and the like. Therefore, the degree of influence exerted on the time or timing at which the work WR2 is performed next on the work object 2 can be considered after the work WR1 is performed on the work object 2.

In addition, since the work amount WL1 performed on the work object 2 can be corrected in consideration of the influence exerted on the time when the work WR2 is performed next, the work amount WL1 performed on the work object 2 can be accurately evaluated.

Specifically, when the degree of influence DG1 exceeds the first threshold value, it is estimated that the influence exerted on the time when the work WR2 is performed next on the work object 2 after the work WR1 is performed on the work object 2 is large, and it is considered that the work amount WL1 estimated by the estimation unit 14 is overevaluated as compared with the work amount WL1 estimated when the degree of influence DG1 is equal to or smaller than the first threshold value. Therefore, the work amount WL1 performed on the work object 2 can be accurately evaluated by executing, by the first correction unit 16a, the first correction process of reducing the work amount WL1 estimated by the estimation unit 14.

By contrast, when the degree of influence DG1 is equal to or smaller than the first threshold value, it is estimated that the influence exerted on the time when the work WR2 is performed next on the work object 2 after the work WR1 is performed on the work object 2 is small, and it is considered that the work amount WL1 estimated by the estimation unit 14 is appropriately evaluated. Therefore, the work amount WL1 performed on the work object 2 can be accurately evaluated without executing, by the first correction unit 16a, the first correction process of reducing the work amount WL1 estimated by the estimation unit 14.

That is, with the work management system 1e according to the second embodiment, when the degree of influence DG1 indicating the degree of influence exerted on the time when the work WR2 is performed next after the work WR1 is performed on the work object 2 is large, the work amount WL1 performed on the work object 2 can be corrected in consideration of the influence exerted on the time when the work WR2 is performed next. Therefore, the work amount WL1 performed on the work object 2 can be accurately evaluated.

As a result, it is possible to easily determine when and how much work processing has been performed on each portion of the work object 2 or work space, or whether no work processing has been performed. Therefore, efficient operation or management can be performed on the work object 2 or work space.

In addition, regarding the various types of work described above, it is possible to easily grasp the history of when the work was performed on the work object 2 at the previous time, and it is possible to efficiently plan the future schedule as to when the work is desirably performed next time. In addition, it is possible to grasp who has performed the work on each portion of the work object 2 to what extent, and it is possible to accurately keep the record. Therefore, it is possible to easily determine when and how much work processing has been performed on each portion of the work object 2, or whether no work processing has been performed.

In addition, for example, it is possible to accurately keep a record of agricultural work performed on an agricultural land, and it is possible to accurately keep a record of when and how much agricultural work has been performed on each portion of the agricultural land. Therefore, it is possible to easily determine when and how much agricultural work has been performed on each portion of the agricultural land, or whether agricultural work has not been performed yet.

Similarly to the fluid blowing device 4 according to the first embodiment described above with reference to FIG. 5, the fluid blowing device 4 according to the second embodiment can use a blower (circulator) that blows gas, which is the fluid 3, to the work object 2, and a detailed description thereof will be omitted.

By contrast, when the blower is used as the fluid blowing device 4 according to the second embodiment, the first storage unit 11 stores the position PS2, which is a position on the surface of the work object 2, in step S41.

In step S43, the calculation unit 13 calculates, as the position PS3, the position PS5 (see FIG. 3), which is the position of a portion located on the axis AX1 (see FIG. 3) passing through the position PS4 (see FIG. 3) and extending in the direction DR2 (see FIG. 3) on the surface of the work object 2, on the basis of the position PS2, the position PS4, and the direction DR2 where, for each of the plurality of time points, the position PS4 is the position PS1 measured at a certain time point and the direction DR2 is the direction DR1 measured at the certain time point.

By such a method, the position PS3 of the portion of the work object 2 to which the fluid 3 is estimated to be blown while the work WR1 is performed can be easily calculated with high accuracy.

As illustrated in FIG. 11, the work management system 1e according to the second embodiment favorably includes a determination unit 32a similarly to the work management system 1 according to the first modification of the first embodiment including the determination unit 32. The determination unit 32a determines the time when the work WR2 is performed such that the time when the work WR2 is performed next on the work object 2 becomes earlier as the first decrease amount when the work amount WL1 is decreased by executing the first correction process by the first correction unit 16a is larger or the work amount WL1 after the first correction process is smaller.

In addition, as illustrated in FIG. 12, in the work management method performed by the work management system 1e according to the second embodiment, favorably, the determination unit 32a determines the time when the work WR2 is performed such that the time when the work WR2 is performed next on the work object 2 becomes earlier as the first decrease amount when the work amount WL1 is decreased by executing the first correction process by the first correction unit 16a is larger or the work amount WL1 after the first correction process is smaller (step S48 in FIG. 12).

As a result, as the degree of influence DG1 indicating the degree of influence exerted on the time when the work WR2 is performed next on the work object 2 is larger, the time when the work WR2 is performed next on the work object 2 can be made earlier. Therefore, the appropriate time at which the work WR2 is performed can be easily determined according to the number of users who utilize or use the work object 2 or work space, or the amount of dust or dirt in the work object 2 or work space when the work is cleaning work, and the like.

As a modification in which the work management system 1a according to the first modification of the first embodiment is applied to a work management system that manages cleaning work is the work management system 1b (see FIG. 8) according to the second modification of the first embodiment, the work management system 1e according to the second embodiment can also be applied to the work management system that manages cleaning work described with reference to FIG. 8 described above.

In addition, as a modification in which the work management system 1a according to the first modification of the first embodiment is applied to a work management system that manages agricultural work is the work management system 1c (see FIG. 9) according to the third modification of the first embodiment, the work management system 1e according to the second embodiment can also be applied to the work management system that manages agricultural work described with reference to FIG. 9 described above.

In addition, as a modification in which the work management system 1a according to the first modification of the first embodiment is applied to a work management system that manages maintenance work on a machine is the work management system 1d (see FIG. 10) according to the fourth modification of the first embodiment, the work management system 1e according to the second embodiment can also be applied to the work management system that manages maintenance work on a machine described with reference to FIG. 10 described above.

Although the invention made by the present inventor has been specifically described based on the embodiments, the present invention is not limited to the embodiments, and it goes without saying that various modifications can be made without departing from the gist of the invention.

Within the scope of the idea of the present invention, those skilled in the art can conceive various changes and modifications, and it is understood that the changes and modifications also fall within the scope of the present invention.

For example, as long as the gist of the present invention is included, those in which a person skilled in the art appropriately adds, deletes, or changes the design of the constituent elements or adds, omits, or changes the conditions of the steps with respect to the above-described embodiments and modifications are included in the scope of the present invention.

The present invention is effectively applied to a work management system that manages work performed on a work object.

What is claimed is:

1. A work management system that manages work performed by moving a fluid blowing device that blows a fluid to a work object and blowing the fluid to the work object by using the fluid blowing device that is moving, the work performed including cleaning work, agricultural work, or maintenance work and
the fluid blowing device including
a position detector configured to measure a plurality of first positions that are positions of the fluid blowing device, and
a direction sensor configured to measure a plurality of first directions that are directions in which the fluid is blown out from the fluid blowing device,
the work management system comprising at least one computer configured to:
store in a first storage a second position that is a position of the work object;
receive input of the plurality of the first positions measured at a plurality of time points and the plurality of the first directions measured at the plurality of time points while a first work, which is included as the work, is performed on the work object;
calculate a third position that is a position of a portion of the work object to which the fluid is estimated to be blown while the first work is performed based on the second position stored in the first storage and the plurality of first positions and the plurality of first directions input;

estimate a first work amount, which is an amount of the first work of the cleaning work, the agricultural work, or the maintenance work performed on the work object, using the third position calculated;

set a first target passing position that is a target position through which the fluid blowing device passes while the first work is performed on the work object; and compare the first target passing position set with each of the plurality of first positions to determine whether the fluid blowing device has passed through the first target passing position while the first work is performed, and execute a first correction process of reducing the first work amount estimated when it is determined that the fluid blowing device has not passed through the first target passing position while the first work is performed.

2. The work management system according to claim 1, wherein the at least one computer is further configured to omit the first correction process when it is determined that the fluid blowing device has passed through the first target passing position while the first work is performed.

3. The work management system according to claim 1, wherein the at least one computer is further configured to:

set a second target passing position that is a target position through which the fluid blowing device passes while the first work is performed on the work object, and an order in which the fluid blowing device passes through the first target passing position and the second target passing position, compare the first target passing position set with each of the plurality of first positions, and compare the second target passing position set with each of the plurality of first positions to determine whether the fluid blowing device has passed through the first target passing position and the second target passing position while the first work is performed, execute the first correction process when it is determined that the fluid blowing device has not passed through the first target passing position while the first work is performed, execute the first correction process when it is determined that the fluid blowing device has not passed through the second target passing position while the first work is performed, determine whether the fluid blowing device has passed through the first target passing position and the second target passing position in the order set while the first work is performed when it is determined that the fluid blowing device has passed through both the first target passing position and the second target passing position while the first work is performed, and execute the first correction process when it is determined that the fluid blowing device has not passed through the first target passing position and the second target passing position in the order that has been set while the first work is performed.

4. The work management system according to claim 1, wherein the at least one computer is further configured to:

receive input of a first degree of influence indicating a degree of influence of internal or external factors affecting a time when a second work, which is included as the work, is performed on the work object after the first work is performed on the work object, and compare the first degree of influence input with a first threshold value, and execute the first correction process when the first degree of influence exceeds the first threshold value.

5. A work management system that manages work performed by moving a fluid blowing device that blows a fluid to a work object and blowing the fluid to the work object by using the fluid blowing device that is moving, the work performed including cleaning work, agricultural work, or maintenance work and the fluid blowing device including
a position detector configured to measure a plurality of first positions that are positions of the fluid blowing device, and
a direction sensor configured to measure a plurality of first directions that are directions in which the fluid is blown out from the fluid blowing device, the work management system comprising at least one computer configured to:

store in a first storage a second position that is a position of the work object;

receive input of the plurality of the first positions measured at a plurality of time points and the plurality of the first directions measured at the plurality of time points while first work, which is included as the work, is performed on the work object;

calculate a third position that is a position of a portion of the work object to which the fluid is estimated to be blown while the first work is performed based on the second position stored in the first storage and the plurality of first positions and the plurality of first directions input;

estimate a first work amount, which is an amount of the first work of the cleaning work, the agricultural work, or the maintenance work performed on the work object, using the third position calculated;

receive input of a first degree of influence indicating a degree of influence of internal and external factors affecting a time when second work, which is the work, is performed on the work object after the first work is performed on the work object; and compare the first degree of influence input with a first threshold value, and execute a first correction process of reducing the first work amount estimated when the first degree of influence exceeds the first threshold value.

6. The work management system according to claim 4, wherein the at least one computer is further configured to:

determine a new time when the second work is to be performed on the work object, which is earlier than a previous time the second work is to be performed, based on a first decrease amount being increased and the first work amount being decreased by executing the first correction process.

7. The work management system according to claim 4, wherein the work management system manages cleaning work that is the work performed by blowing the fluid to the work object to blow off dust or dirt on a surface of the work object by using the fluid blowing device that is moving, and the first degree of influence is at least one selected from the group consisting of number of users who have used the work object, a time during which the user has used the work object, and an amount of dust or dirt on the surface of the work object.

8. The work management system according to claim 7, wherein the fluid blowing device is a blower that blows gas to the work object, the gas being the fluid, and the blower includes a cylindrical portion, a suction port that is provided at a first end portion of the cylindrical portion in an axial direction and through which the gas is sucked, a blow-out port that is provided at a second end portion opposite to the first end portion in the axial direction of the cylindrical portion and through which the gas is blown out, and a fan that is provided inside the cylindrical portion, sucks the gas from the suction port, and blows out, from the blow-out port, the gas sucked from the suction port, and wherein the at least one computer is further configured to:

store in the first storage the second position that is a position on the surface of the work object, and calculate, as the third position, a fifth position that is a position of a portion located on a first axis passing through a fourth position and extending in a second direction on the surface of the work object based on the second position, the fourth position, and the second direction where, for each of the plurality of time points, the fourth position is the first position measured at the time point and the second direction is the first direction measured at the time point.

9. The work management system according to claim 4, wherein the work object is an agricultural land, the work management system manages agricultural work that is the work performed by blowing the fluid containing an agricultural chemical or water to the agricultural land by using the fluid blowing device that is moving, and the first degree of influence is at least one selected from the group consisting of number of invading bodies including humans, vermin, or insect pests that have intruded into the agricultural land, a time during which the invading body has intruded into the agricultural land, a distance by which the invading body has moved in the agricultural land, and weather information on the agricultural land.

10. The work management system according to claim 4, wherein the work object is a machine, the work management system manages maintenance work that is the work performed by blowing the fluid to the machine by using the fluid blowing device that is moving, and the first degree of influence is at least one selected from the group consisting of a time during which the machine has operated, a distance by which the machine has moved when the machine is movable, a time during which a malfunction has occurred in the machine, and a type of the malfunction that has occurred in the machine.

11. The work management system according to claim 1, wherein the at least one computer is further configured to:

receive input of a second degree of influence indicating a degree of influence of internal and external factors affecting a time when a third work, which is included as the work, is performed on the work object after the first work is performed on the work object; and compare the second degree of influence input with a second threshold value, and execute a second correction process of correcting the first target passing position so that the first target passing position set is moved close to a central position of the work object in plan view when the second degree of influence exceeds the second threshold value.

* * * * *